(12) United States Patent
Kendall et al.

(10) Patent No.: US 11,876,795 B2
(45) Date of Patent: Jan. 16, 2024

(54) RESOURCE PROCESSING TERMINAL DEVICE WITH ENHANCED SECURE RESOURCE TRANSMISSIONS BASED ON IMAGE CAPTURE

(71) Applicant: BANK OF AMERICA CORPORATION, Charlotte, NC (US)

(72) Inventors: Charles Russell Kendall, Snoqualmie, WA (US); Richard C. Clow, II, Morristown, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 223 days.

(21) Appl. No.: 17/459,503

(22) Filed: Aug. 27, 2021

(65) Prior Publication Data

US 2023/0065687 A1 Mar. 2, 2023

(51) Int. Cl.
*H04L 9/40* (2022.01)

(52) U.S. Cl.
CPC .................................. *H04L 63/083* (2013.01)

(58) Field of Classification Search
CPC ... H04L 63/083; H04L 63/0853; H04L 63/10; H04L 63/107; H04L 63/12; H04L 63/20
See application file for complete search history.

(56) References Cited

U.S. PATENT DOCUMENTS

| | | | |
|---|---|---|---|
| 5,974,146 A | 10/1999 | Randle et al. | |
| 6,119,944 A | 9/2000 | Mulla et al. | |
| 7,028,008 B2 | 4/2006 | Powar | |
| 7,349,884 B1 | 3/2008 | Odom et al. | |
| 8,396,278 B2 | 3/2013 | Jones et al. | |
| 8,549,070 B2 | 10/2013 | Serenyi et al. | |
| 8,626,659 B1 | 1/2014 | Bowman et al. | |
| 8,630,949 B2 | 1/2014 | Mclaughlin et al. | |
| 9,721,236 B2 | 8/2017 | Gauvin et al. | |
| 10,599,826 B2 * | 3/2020 | Kazerani | H04L 63/107 |
| 10,990,109 B2 * | 4/2021 | Nelson | G05D 1/0276 |
| 11,042,882 B2 | 6/2021 | Ledford et al. | |
| 11,363,106 B2 * | 6/2022 | Nelluri | G06Q 20/1085 |
| 11,398,144 B2 * | 7/2022 | Shakedd | G06F 21/602 |
| 11,520,870 B2 * | 12/2022 | Xia | H04L 63/083 |
| 11,522,861 B2 * | 12/2022 | Touati | H04L 9/3234 |
| 11,592,898 B2 * | 2/2023 | Ricknäs | G02F 1/1393 |

(Continued)

*Primary Examiner* — Hosuk Song
(74) *Attorney, Agent, or Firm* — Moore & Van Allen PLLC; Vaidehi Bachoti

(57) ABSTRACT

Embodiments of the invention are directed to systems, methods, and computer program products for enhanced secure resource transmissions based on image capture via a resource processing terminal device. The invention provides a secure platform for transformation and structuring of resource data at a resource instrument device, and authentication of resource data, prior to initiation of a resource activity at the resource processing terminal device. Specifically, the invention is structured to construct an authorized credential element for processing of a resource activity at a first time interval prior to initiation of the resource activity. The invention is structured to execute a first resource processing activity at a subsequent time interval using the first authorized credential element, upon determining that the authorized credential element is compatible with the activity, and that the authorized credential element is pre-authenticated.

20 Claims, 6 Drawing Sheets

(56) References Cited

U.S. PATENT DOCUMENTS

| | | |
|---|---|---|
| 2003/0080948 A1 | 5/2003 | Lapstun et al. |
| 2006/0067576 A1 | 3/2006 | Marggraff et al. |
| 2012/0136781 A1 | 5/2012 | Fridman et al. |
| 2014/0214638 A1 | 7/2014 | Hall et al. |
| 2014/0344150 A1 | 11/2014 | Kapur |
| 2015/0088709 A1 | 3/2015 | Mekala et al. |
| 2015/0193748 A1 | 7/2015 | Pentel |
| 2016/0132884 A1 | 5/2016 | Fridman et al. |
| 2017/0017942 A1 | 1/2017 | Nix et al. |
| 2017/0069019 A1 | 3/2017 | Kendall et al. |
| 2017/0221066 A1 | 8/2017 | Ledford et al. |
| 2018/0211340 A1 | 7/2018 | Cook |
| 2019/0333160 A1 | 10/2019 | Chen |
| 2021/0004773 A1 | 1/2021 | Dolan et al. |
| 2021/0208938 A1 | 7/2021 | Clow, II et al. |

\* cited by examiner

RESOURCE PROCESSING TERMINAL DEVICE WITH ENHANCED SECURE RESOURCE TRANSMISSIONS BASED ON IMAGE CAPTURE

FIELD

The invention is described herein is directed to systems, methods and computer program products for enhanced secure resource transmissions based on image capture via a resource processing terminal device. In some aspects, the invention provides a secure platform for preemptive transformation and structuring of resource data at a resource instrument device, and authentication of resource data for processing, prior to initiation of a resource activity at the resource processing terminal device.

BACKGROUND

Transmissions of activity data associated from networked devices is increasingly widespread. Some conventional systems employ instrument devices with integrated circuit chips (e.g., credit cards with contactless payment chips) that can be read using near field communication or radio frequency communication, for the purposes of easily and quickly transmitting data for initiating activities. Maintaining security of activity data from networked devices and determining authorization of the users and/or the entities involved in the activities is an important concern. However, determining validity of activities and processing thereof is time intensive and consumes immense processing resources. Accordingly, unauthorized individuals may still be able to access the execution of the activities in the time interval between initiation of the activities and completion of the activities. Moreover, conventional rapid interaction completion systems inherently not structured for preemptive resource data. Therefore, there is a need for systems, methods and computer program products for maintaining security of and authenticating activity data from networked devices, determining authorization of the users and/or the entities involved in the activities, determining validity of activities and providing a more efficient exchange of resources within the rapid interaction completion system.

The previous discussion of the background to the invention is provided for illustrative purposes only and is not an acknowledgement or admission that any of the material referred to is or was part of the common general knowledge as at the priority date of the application.

BRIEF SUMMARY

Some embodiments of the invention are directed to systems, apparatuses, methods and computer program products for enhanced secure resource transmissions based on image capture via a resource processing terminal device. Specifically, the systems, apparatuses, methods and computer program products of the present invention are directed to a secure platform for preemptive transformation and structuring of resource data at a resource instrument device, and authentication of resource data for processing, prior to initiation of a resource activity at the resource processing terminal device. In some embodiments the apparatuses and systems comprise a resource processing terminal device structured for operative communication with a resource instrument device via a first proximity communication channel between the first networked device and the resource instrument device. Typically, the first networked device comprises a proximity scanner device structured for detecting at least one parameter associated with the resource instrument device via the first proximity communication channel. In some embodiments the apparatuses and systems further comprise at least one memory device, at least one communication device connected to a distributed network and at least one processing device operatively coupled to the at least one memory device. The apparatuses and systems further comprise a module stored in the at least one memory device comprising executable instructions that when executed by the at least one processing device, cause the at least one processing device to: construct, via a resource instrument device application, a first authorized credential element for processing of a resource activity at a first time interval prior to initiation of the resource activity, wherein the first authorized credential element is structured for authorizing processing of the resource activity prior to initiation of the resource activity; receive, via a first operative communication channel, a first trigger signal from the resource processing terminal device at a second time interval succeeding the first time interval, wherein the first trigger signal comprises a first activity data structure; based on analyzing the first trigger signal, determine a first resource processing activity initiated by a user at the second time interval; transmit a control signal to the proximity scanner device associated with a first entity, wherein the control signal is structured to cause the proximity scanner device to scan a predetermined vicinity radius around the resource processing terminal device to identify the resource instrument device; transmit, via the resource processing terminal device, second trigger signal to cause presentation of the first authorized credential element associated with the resource instrument device; extract, via the resource processing terminal device, data associated with the first authorized credential element from the resource instrument device via the first proximity communication channel between the first networked device and the resource instrument device; and in response to determining that (i) the first authorized credential element is compatible with the first resource processing activity, and that (ii) the first authorized credential element is pre-authenticated prior to initiation of the first resource processing activity at the second time interval, execute the first resource processing activity at a third time interval succeeding the second time interval using the first authorized credential element.

In some embodiments, or in combination with any of the previous embodiments, constructing the first authorized credential element for processing of the resource activity at the first time interval prior to initiation of the resource activity, further comprises: generating, via a resource instrument device application, resource processing data for processing of a resource activity at a first time interval, prior to initiation of the resource activity, wherein the resource activity processing data is associated with a user, wherein the resource activity processing data comprises a unique identifier associated with the user; pre-authenticating, via the resource instrument device application, the resource processing data for authorizing processing of the resource activity prior to initiation of the resource activity; transforming, via the resource instrument device application, the pre-authenticated resource processing data to construct a first authorized credential element such that the first authorized credential element is compatible with the resource instrument device; and providing the first authorized credential element at the resource instrument device.

In some embodiments, or in combination with any of the previous embodiments, pre-authenticating the resource processing data for authorizing processing of the resource activity prior to initiation of the resource activity, further comprises embedding an authentication code in pre-authenticate d resource processing data.

In some embodiments, or in combination with any of the previous embodiments, causing presentation of the first authorized credential element associated with the resource instrument device further comprises: activating a resource instrument device application the resource instrument device, wherein activating the resource instrument device application further comprises (i) revoking user permissions associated with use of the resource instrument device, and (ii) causing a current application running on the resource instrument device to run in the background; presenting, via the resource instrument device application, a graphical element associated with the first authorized credential element on a display device associated with the resource instrument device; and in response to determining the extraction of the data associated with the first authorized credential element from the resource instrument device via the first proximity communication channel between the first networked device and the resource instrument device by the resource processing terminal device, dynamically triggering (i) discontinuation of the presentation of the graphical element associated with the first authorized credential element, and (ii) restoration of the user permissions.

In some embodiments, or in combination with any of the previous embodiments, determining that the first authorized credential element is compatible with the first resource processing activity further comprises: extracting activity processing data from the first activity data structure associated with the first resource processing activity; determining a plurality of activity processing parameters associated with performing the first resource processing activity; transforming the extracted data associated with the first authorized credential element into resource processing data of the first authorized credential element; and determining that the first authorized credential element is compatible with the first resource processing activity based on at least determining that at least one of the plurality of activity processing parameters associated with performing the first resource processing activity matches one or more parameters associated with resource processing data of the first authorized credential element.

In some embodiments, or in combination with any of the previous embodiments, determining that the first authorized credential element is pre-authenticated prior to initiation of the first resource processing activity at the second time interval, further comprises: analyzing extracted data associated with the first authorized credential element to determine resource processing data of the first authorized credential element; and detecting an embedded authentication code in the extracted data associated with the first authorized credential element.

In some embodiments, or in combination with any of the previous embodiments, the first authorized credential element is pre-authenticated at a first authentication level. Here, the invention is further configured to: in response to the second trigger signal and prior to the extraction of data associated with the first authorized credential element from the resource instrument device via the first proximity communication channel between the first networked device and the resource instrument device, trigger an escalated second authentication level requirement above the first authentication level based on at least the first authentication level and the resource activity processing data associated with the first resource processing activity; determine a location parameter associated with the resource instrument device, such that the location parameter is associated with the escalated second authentication level requirement; and modify the first authorized credential element by embedding the location parameter associated with the escalated second authentication level requirement.

In some embodiments, or in combination with any of the previous embodiments, determining that the first authorized credential element is pre-authenticated prior to initiation of the first resource processing activity at the second time interval, further comprises: analyzing extracted data associated with the first authorized credential element to determine resource processing data of the first authorized credential element; detecting the location parameter in the extracted data associated with the first authorized credential element; and determining a spatial congruence of the location parameter and an entity location parameter associated with the resource processing terminal device.

In some embodiments, or in combination with any of the previous embodiments, the invention is further configured to: in response to determining completion of execution of the first resource processing activity using the first authorized credential element, dynamically trigger (i) disabling of the first authorized credential element such that the first authorized credential element is inoperative, and (ii) deletion of the first authorized credential element.

In some embodiments, or in combination with any of the previous embodiments, the invention is further configured to: in response to determining that the first authorized credential element is not compatible with the first resource processing activity, transmit, via the resource processing terminal device, third trigger signal to cause presentation of a second authorized credential element associated with the resource instrument device; extract, via the resource processing terminal device, data associated with the second authorized credential element from the resource instrument device via the first proximity communication channel between the first networked device and the resource instrument device; and in response to determining that (i) the second authorized credential element is compatible with the first resource processing activity, and that (ii) the second authorized credential element is pre-authenticated prior to initiation of the first resource processing activity at the second time interval, execute the first resource processing activity at the third time interval succeeding the second time interval using the second authorized credential element.

In some embodiments, or in combination with any of the previous embodiments, the resource instrument device comprises an integrated circuit chip, wherein the resource instrument device is structured for contactless communication with the resource processing terminal device via the first proximity communication channel comprising near field communication and/or radio frequency communication (RFID).

In some embodiments, or in combination with any of the previous embodiments, the resource instrument device is a physical object, and wherein the first proximity communication channel comprises optical communication.

In some embodiments, or in combination with any of the previous embodiments, transmitting the control signal to the proximity scanner device associated with the first entity to cause the proximity scanner device to scan the predetermined vicinity radius around the resource processing terminal device, further comprises: activating a plurality of transmitter devices proximate the resource processing terminal device associated with the first entity; causing each of the plurality of transmitter devices to transmit a predetermined signal to scan for devices having the first authorized credential element; identifying, via a first transmitter device of the plurality of transmitter devices, the first authorized credential element of the resource instrument device; and disabling the plurality of transmitter devices associated with the first entity.

In some embodiments, or in combination with any of the previous embodiments, executing the first resource processing activity at the third time interval succeeding the second time interval using the first authorized credential element, further comprises: creating a resource exchange message for providing the resources to the first entity; operatively coupling the first authorized credential element to the resource exchange message; and transmitting a resource value from a user resource associated with the user to an entity resource over a real-time resource exchange network in real-time using the resource exchange message.

BRIEF DESCRIPTION OF THE DRAWINGS

Figure 1A:
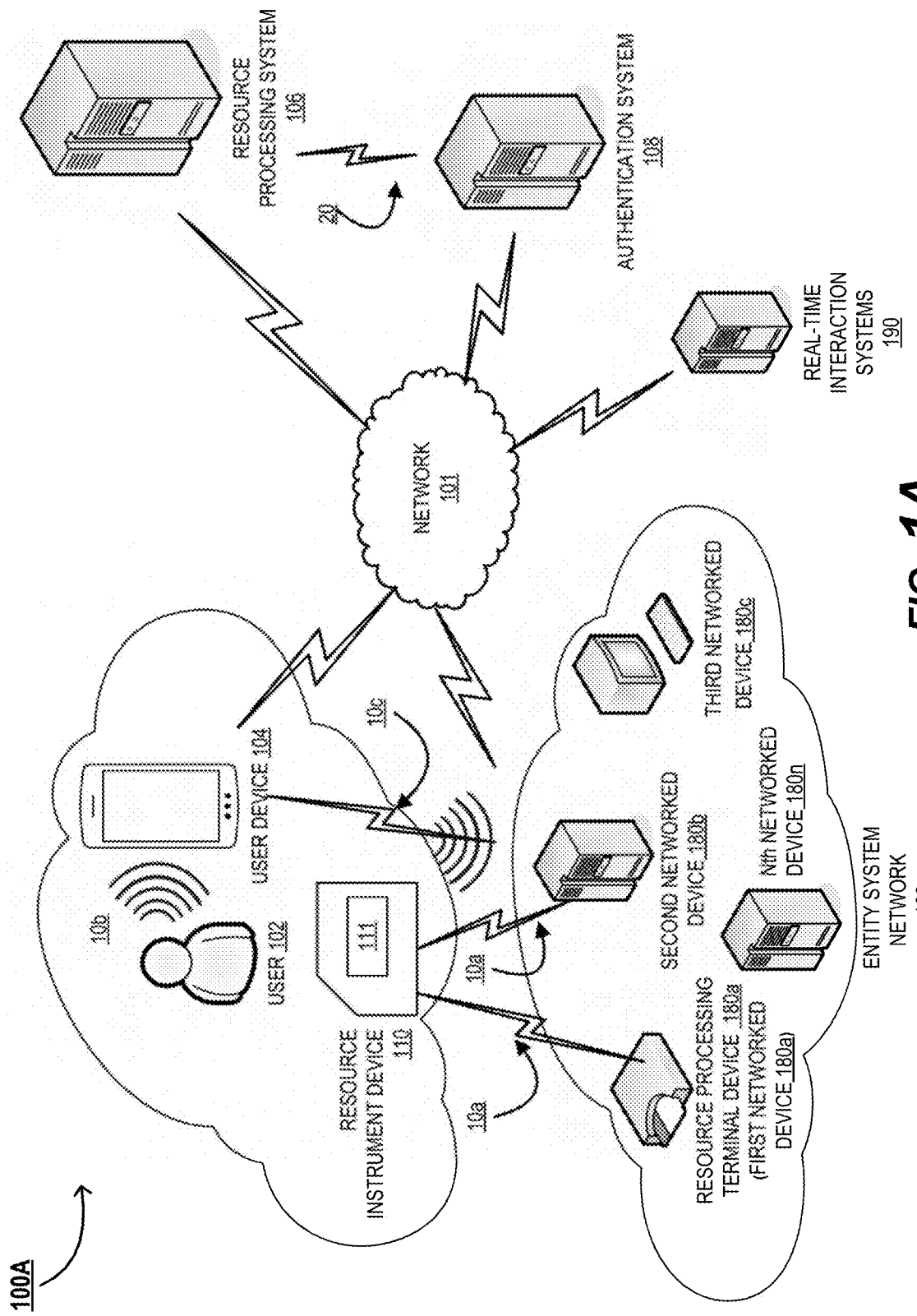
Figure 1B:
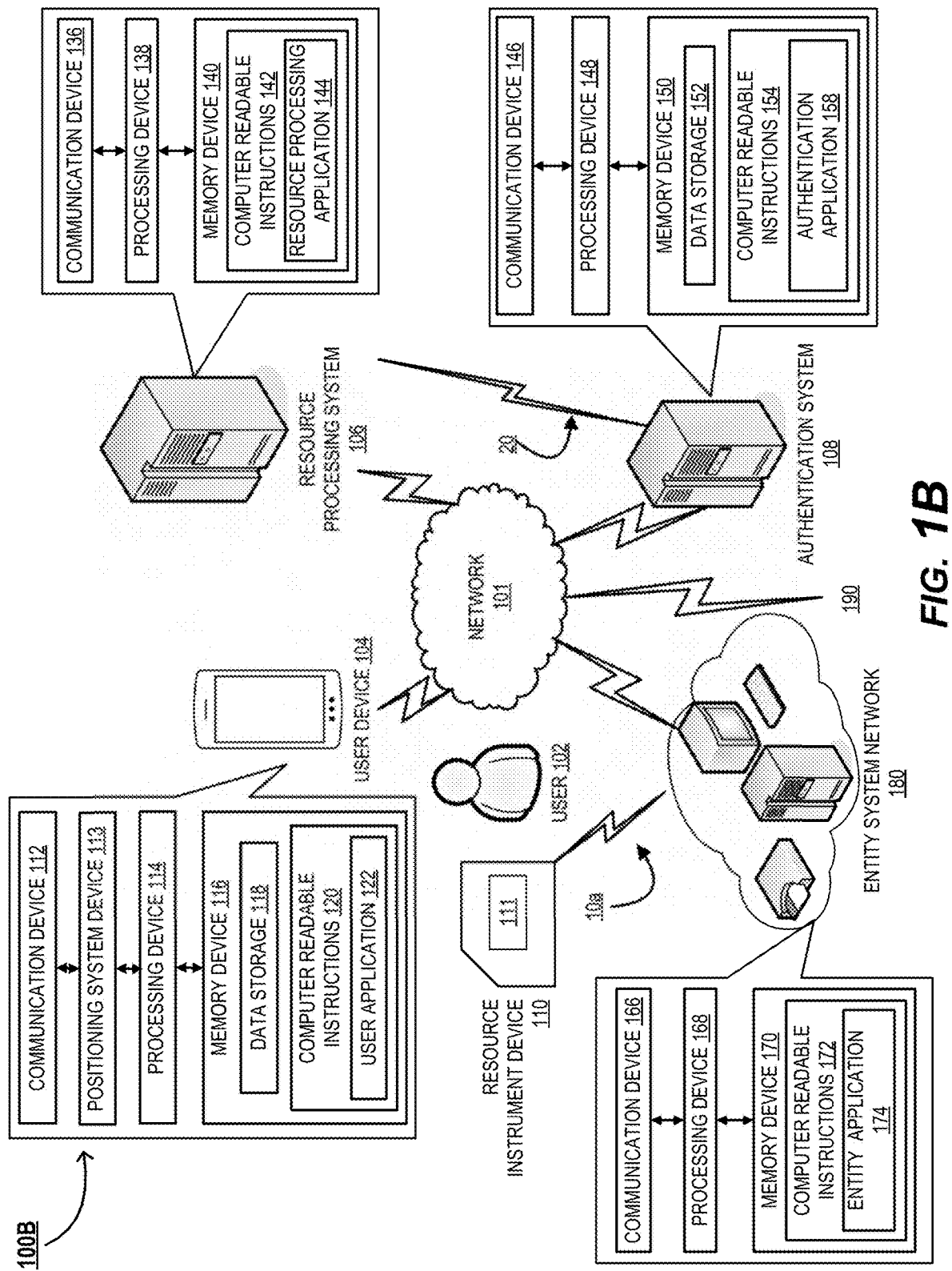
Figure 2:
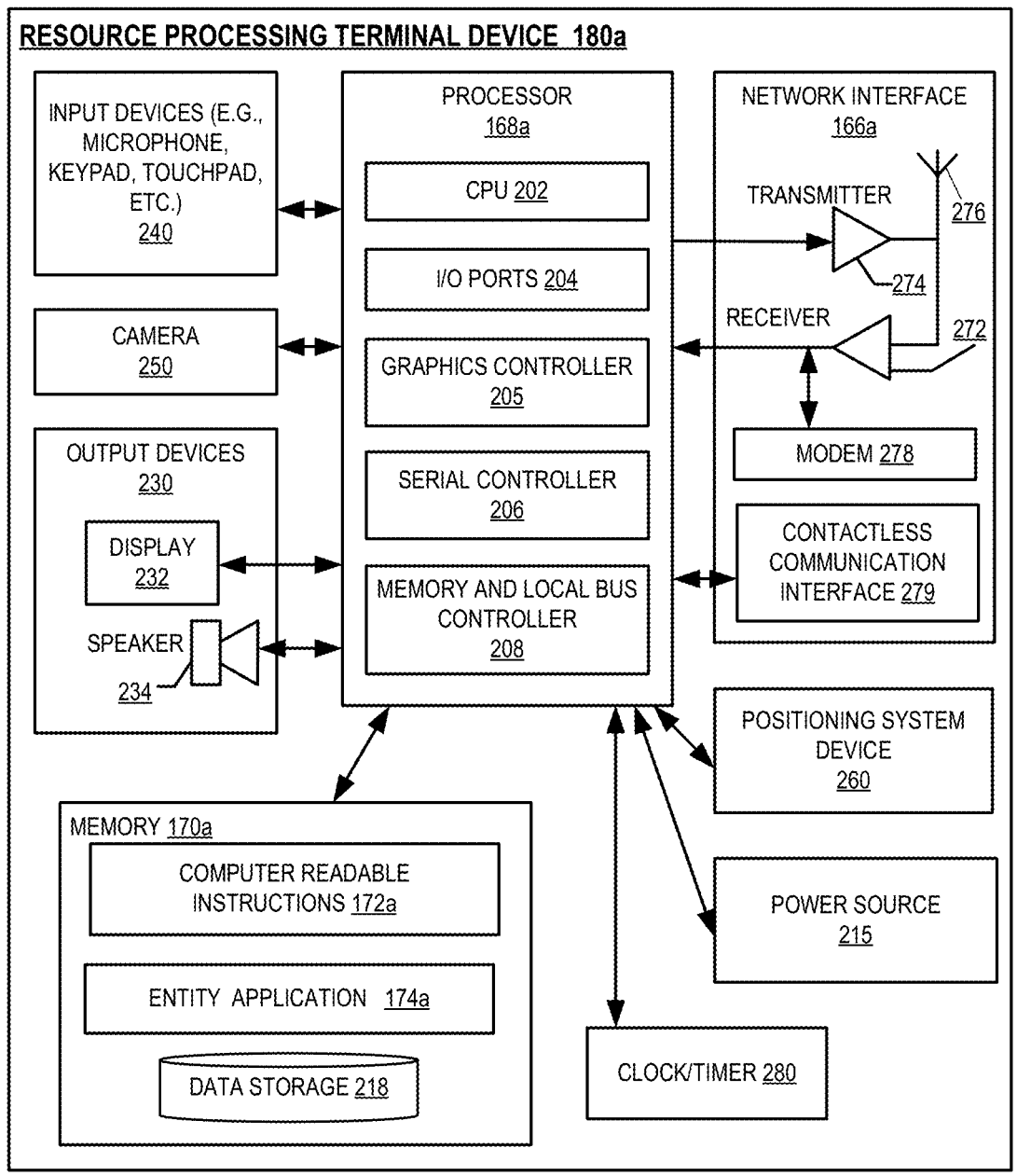
Figure 3:
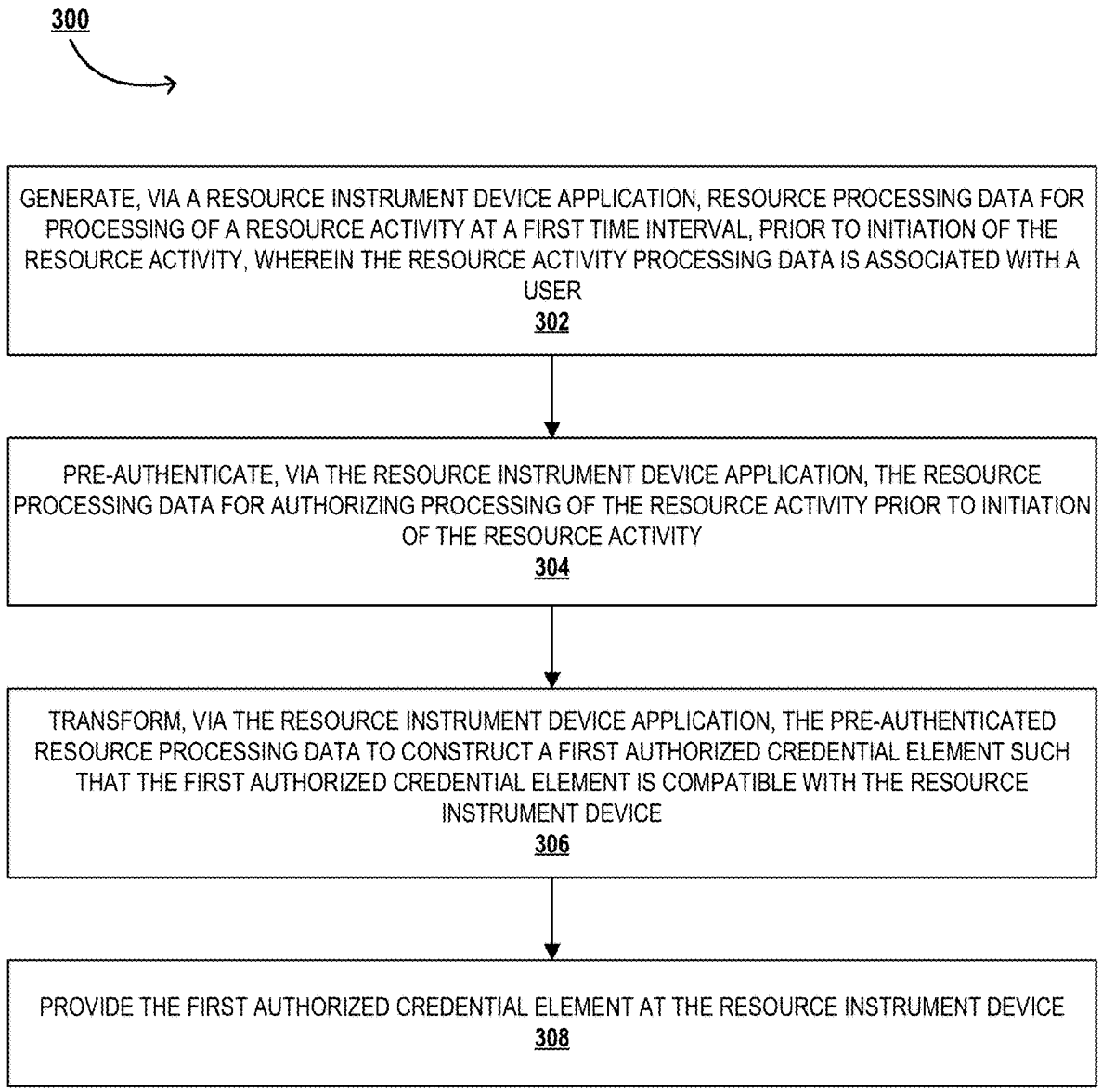
Figure 4:
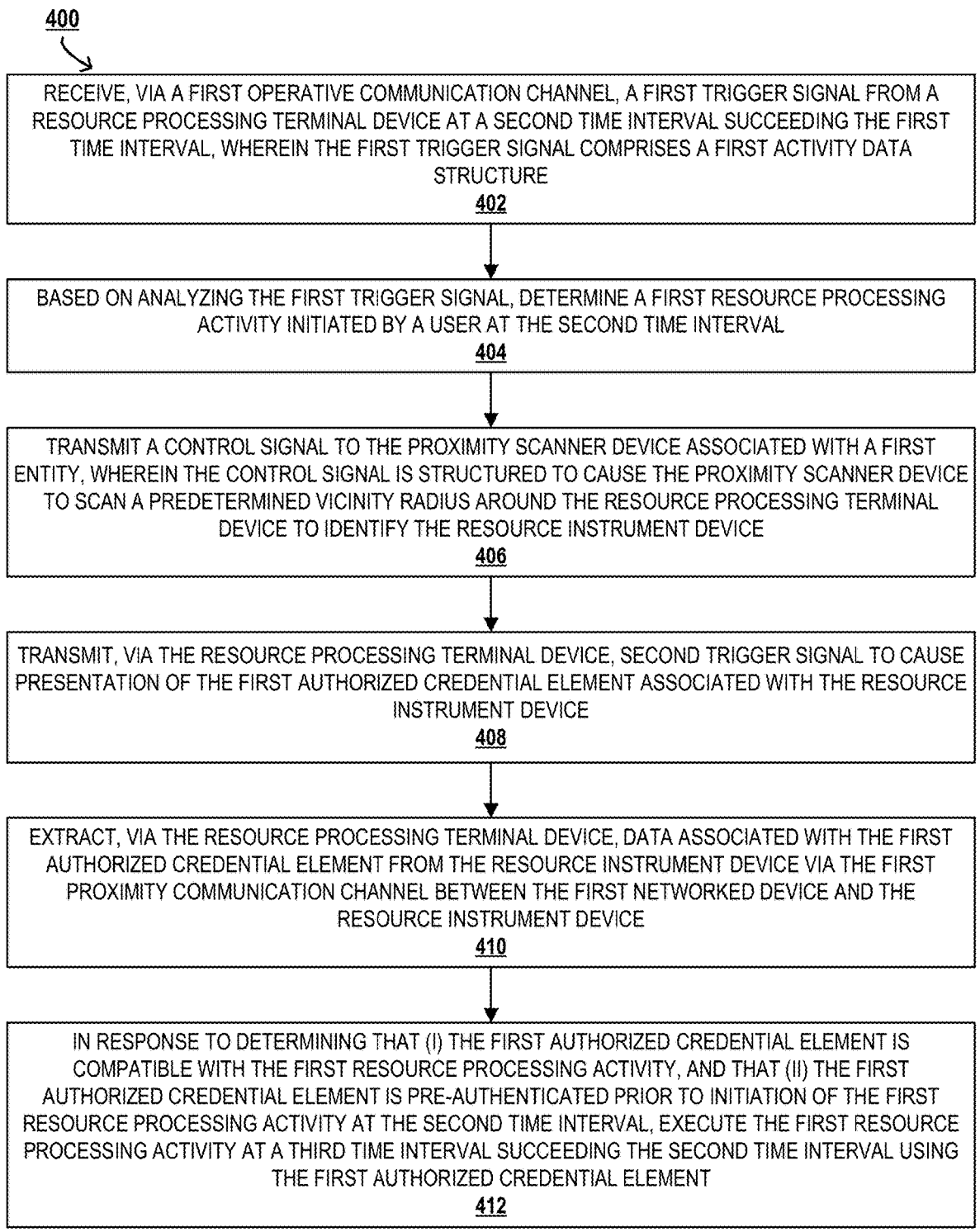
Figure 5:
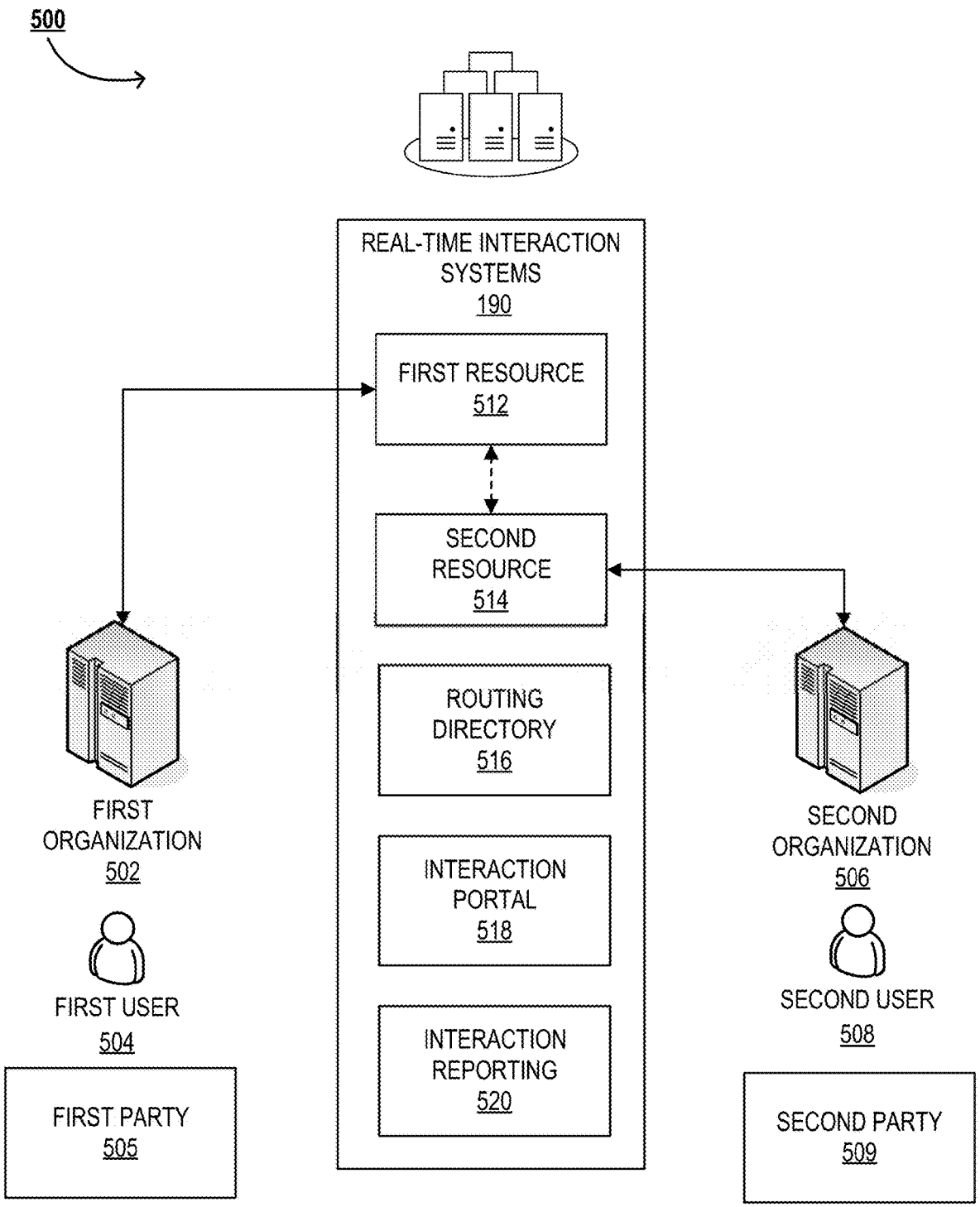

Having thus described embodiments of the invention in general terms, reference will now be made to the accompanying drawings, where:

FIG. 1A illustrates a schematic representation 100A of an authentication system and environment, in accordance with embodiments of the present invention;

FIG. 1B illustrates a schematic representation 100B of the authentication system and environment of FIG. 1A, in accordance with embodiments of the present invention;

FIG. 2 illustrates a schematic representation 200 of a resource processing terminal device, in accordance with embodiments of the present invention;

FIG. 3 illustrates a high-level process flow 300 for construction of a pre-authorized credential element for processing of a resource activity, in accordance with embodiments of the present invention;

FIG. 4 illustrates a high-level process flow 400 for enhanced secure resource transmissions based on image capture via a resource processing terminal device, in accordance with embodiments of the present invention; and FIG. 5 illustrates a schematic representation 500 of a real-time interaction system environment, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be a merchant, a seller, a store, a financial institution, and/or the like. In some embodiments, a "merchant" may be defined as any organization, entity, or the like providing product or services for sale to a user. In some embodiments, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish a resource or an account with the entity. A "resource" or "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, user information provided by the user, or the like. The account is associated with and/or maintained by an entity. In other embodiments, an "entity" may not be a financial institution.

Unless specifically limited by the context, a "user activity", "transaction" or "activity" refers to any communication between the user and an entity (e.g., a merchant, a financial institution, and/or another entity). In some embodiments, for example, a user activity may refer to a purchase of goods or services, a return of goods or services, a payment transaction, a credit transaction, or other interaction involving a user's resource, e.g., bank account. As another example, in some embodiments, a user activity may refer to viewing account balances, modifying user information and contact information associated with an account, modifying alert/notification preferences, viewing transaction/activity history, transferring/redeeming loyalty points and the like. In some embodiments, the user activity is associated with an entity application stored on a user device, for example, a digital wallet application, a mobile/online banking application, a merchant application, a browser application, a social media application and the like. Typically, a user activity is an electronic transaction or electronic activity in which the user is employing a mobile device, computing device, or other electronic device to initiate, execute and/or complete the activity.

As used herein, a "resource" may refer to a bank account, a credit account, a debit/deposit account, or the like. Although the phrase "bank account" includes the term "bank," the account need not be maintained by a bank and may, instead, be maintained by other financial institutions. For example, in the context of a financial institution, a user activity or transaction may refer to one or more of a sale of goods and/or services, an account balance inquiry, a rewards transfer, an account money transfer, opening a bank application on a user's computer or mobile device, a user accessing their e-wallet (e.g., mobile wallet) or online banking account or any other interaction involving the user and/or the user's device that is detectable by the financial institution. As further examples, a user activity may occur when an entity associated with the user is alerted via the transaction of the user's location. A user activity may occur when a user accesses a building or a dwelling, uses a rewards card, and/or performs an account balance query. A user activity may occur as a user's device establishes a wireless connection, such as a Wi-Fi connection, with a point-of-sale terminal. In some embodiments, a user activity may include one or more of the following: purchasing, renting, selling, and/or leasing goods and/or services (e.g., groceries, stamps, tickets, DVDs, vending machine items, and the like); withdrawing cash; making payments (e.g., paying monthly bills; paying federal, state, and/or local taxes; and the like); sending remittances; transferring balances from one account to another account; loading money onto stored value cards (SVCs) and/or prepaid cards; donating to charities; and/or the like.

In some embodiments, a "resource" may refer to an online banking account, such as an account that is associated with one or more user accounts at a financial institution. For example, the user may have an online banking account that is associated with the user's checking account, savings account, investment account, and/or credit account at a particular financial institution. Authentication credentials comprising a username and password are typically associated with the online banking account and can be used by the user to gain access to the online banking account. The online banking account may be accessed by the user over a network (e.g., the internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

In some embodiments, a "user" may be an individual or group of individuals associated with user activities such as purchases from an entity such as a merchant. In some embodiments, a "user" may be an individual or group of individuals associated with resources (e.g., accounts, credit cards, etc.) at an entity such as a financial institution. A "user" may be an individual or group of individuals associated with an entity that provides the system for assessing authentication requirements based on situational instance. In some embodiments, the "user" may be a financial institution user (e.g., an account holder or a person who has an account (e.g., banking account, credit account, or the like)). In one aspect, a user may be any financial institution user seeking to perform user activities associated with the financial institution or any other affiliate entities associated with the financial institution. In some embodiments, the user may be an individual who may be interested in opening an account with the financial institution. In some other embodiments, a user may be any individual who may be interested in the authentication features offered by the financial institution/entity. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably.

In accordance with some embodiments of the invention, a resource instrument device may refer to a paper check, with an authorized credential element printed thereon. In accordance with some embodiments of the invention, a resource instrument device may refer to a mobile device (e.g., a user device), with an authorized credential element in the form of a QR code stored and displayed thereon. In accordance with some embodiments of the invention, a resource instrument device may refer to a card having an integrated circuit chip, with an authorized credential element stored on the integrated circuit chip. In accordance with some embodiments of the invention, a resource instrument device may refer to a user device application (e.g., a digital wallet application) of a mobile device (e.g., a user device), with an authorized credential element in the form of a token stored and/or displayed thereon.

As discussed previously, transmissions of activity data associated from networked devices is increasingly widespread. Some conventional systems employ instrument devices with integrated circuit chips (e.g., credit cards with contactless payment chips) that can be read using near field communication or radio frequency communication, for the purposes of easily and quickly transmitting data for initiating activities. Maintaining security of activity data from networked devices and determining authorization of the users and/or the entities involved in the activities is an important concern. However, determining validity of activities and processing thereof is time intensive and consumes immense processing resources.

Accordingly, unauthorized individuals may still be able to access the execution of the activities in the time interval between initiation of the activities and completion of the activities. Second, in conventional systems, the authentication and authorization of activities is only possible after initiation of the activity and receipt of relevant resource, activity and entity (e.g., merchant) data, rendering it inherently impossible to perform preemptive security actions prior to initiation of the activity. Moreover, once authenticated and authorized, the parameters of the activity cannot be modified. Any modification would require performing additional authentication and authorization for the modified data anew.

Embodiments of the present invention address the above needs and/or achieve other advantages by providing apparatuses (e.g., a system, computer program product and/or other devices) and methods for maintaining security of and authenticating activity data from networked devices, determining authorization of the users and/or the entities involved in the activities, determining validity of activities and providing a more efficient exchange of resources within the rapid interaction completion system. First, because the present invention allows for preemptive transformation and structuring of resource data at a resource instrument device, and authentication of resource data for processing, prior to initiation of a resource activity at the resource processing terminal device, it inherently precludes unauthorized individuals may still be able to access the execution of the activities in the time interval between initiation of the activities and completion of the activities, as in conventional systems. Second, the present invention allows for preemptive transformation and structuring of resource data at a resource instrument device, and authentication of resource data for processing, without requiring associated entity (e.g., merchant) data. This allows the user to deploy the pre-authenticated resource instrument device for any applicable activity and entity, thereby allowing the user to flexibly and securely employ the pre-authenticated resource instrument device, without requiring performing additional authentication and authorization for the modified data anew. The solution provided by the present system not only addresses the above concerns, but also provides a high level of authentication (i) seamlessly, (ii) without unduly interrupting the user and (iii) in the background/in parallel while other tasks are being performed as well.

FIGS. 1A-1B illustrate schematic representations 100A and 100B of an authentication system and environment 100, in accordance with embodiments of the present invention.

FIGS. 1A-1B provide a unique system that includes specialized servers and systems, communicably linked across a distributive network of nodes required to perform the functions of providing enhanced secure resource transmission paradigms, such as preemptive transformation and structuring of resource data at a resource instrument device, and authentication of resource data for processing, prior to initiation of a resource activity at the resource processing terminal device. The authentication system provides a dynamic platform for enhanced secure resource transmissions based on image capture via a resource processing terminal device. The authentication system further provides a platform for dynamically authenticating transmitted activity processing data based on establishing seamless electronic communication handshake between network devices and without requiring user intervention. As illustrated in FIGS. 1A-1B, the authentication system 108 or application server is operatively coupled, via a network 101 to the user device 104, to the resource processing system 106, and one or more devices of an entity system network 180 (e.g., first networked device 180a (resource processing terminal device 180a), second networked device 180b, third networked device 180c, . . . , $N^{th}$ networked device 180n, and/or the like) and to real-time interaction systems 190. In this way, the authentication system 108 can send information to and receive information from the user device 104, the resource processing system 106 or financial institution server, the real-time interaction systems 190, etc. FIGS. 1A-1B illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network signals and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the network 101 may enable communication between devices thorough near-field communication, transmission of electromagnetic waves, sound waves or any other suitable means. In some embodiments, the network 101 includes the internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user mobile device 104 and the second networked device 180b). In this regard, the wireless communication channel may further comprise near field communication (NFC), communication via radio waves, communication through the internet, communication via electromagnetic waves and the like. In some embodiments, the wireless communication channel may further comprise an optical communication, e.g., in the form of image scanning and transmission.

In some embodiments, the user 102 is an individual that has a user device 104, such as a mobile phone, tablet, or the like. The user device 104 may be, for example, a desktop personal computer, a mobile system, such as a cellular phone, smart phone, personal data assistant (PDA), laptop, or the like. The user device 104 generally comprises a communication device 112, a processing device 114, and a memory device 116. The user device 104 may comprise a positioning system device 113 configured for location determination/navigation (GPS devices, accelerometers and the like). The user device 104 may comprise other devices that are not illustrated, configured for authentication (fingerprint scanners, microphones, iris scanners and the like), for image capture (cameras, AR devices and the like), for display (screens, hologram projectors and the like), and other purposes. The user device 104 is a computing system that enables the user to perform one or more authentication functions for one or more user activities. The processing device 114 is operatively coupled to the communication device 112 and the memory device 116. The processing device 114 uses the communication device 112 to communicate with the network 101 and other devices on the network 101, such as, but not limited to the resource processing system 106, the compatible devices (180a-180n) of the entity system network 180 and the authentication system 108. As such, the communication device 112 generally comprises a modem, server, or other device for communicating with other devices on the network 101. In some embodiments, the user device 104 may comprise one or more user devices comprising mobile phones, tablets, smartphones, computers and wearable devices like smart watches, glasses, jewelry, fitness and activity monitors and the like.

The user device 104 comprises computer-readable instructions 120 and data storage 118 stored in the memory device 116, which in one embodiment includes the computer-readable instructions 120 of a user application 122. In some embodiments user device 104 may refer to multiple user devices that may be configured to communicate with the authentication system and/or the resource processing system 106 via the network 101. The user application 122 may be a standalone application configured for dynamic authentication assessment or the user application 122 may refer to one or more existing applications on the user device. In some embodiments the authentication system 108 and/or the resource processing system 106 may transmit control signals to the user device, configured to cause the user application 122 to perform one or more functions or steps associated with enhanced secure resource transmissions. The user 102 may communicate with the user device 104 via a proximity communication channel 10b involving, audio communication, gesture-based communication, video communication, textual communication, biometric based communication, and/or the like.

The user 102 may further be associated with a resource instrument device 110. In accordance with some embodiments of the invention, the resource instrument device 110 may refer to a paper check, with an authorized credential element 111 printed thereon. In accordance with some embodiments of the invention, a resource instrument device 110 may refer to a mobile device (e.g., the user device 104), with an authorized credential element 111 in the form of a QR code stored and displayed thereon. In accordance with some embodiments of the invention, a resource instrument device 110 may refer to a card having an integrated circuit chip, with an authorized credential element 111 stored on the integrated circuit chip. Here, the resource instrument device 110 may further comprise an antenna (not illustrated). In some embodiments, the authorized credential element 111 may be an embedded integrated circuit chip 111 of the resource instrument device 110 in the form of a card (e.g., a credit or debit card structured for contactless payment). The embedded integrated circuit chip and antenna allow for the user 102 to wave their resource instrument device 110 proximate a reader at the first networked device 180a/resource processing terminal device 180a (e.g., a point of sale terminal, a point of sale terminal, an ATM, etc.) of the entity system network 180, e.g., for performing resource transfers (e.g., payments) for a user activity (e.g., purchase).

In some embodiments the resource instrument device 110 is structured for contactless communication with the first networked device 180a/resource processing terminal device 180a (e.g., a point of sale terminal, an ATM, etc.) of the entity system network 180 via a first proximity channel 10a. Communication via the first proximity channel 10a comprises communications using near field communication and/or radio frequency communication (RFID), optical communication, and/or the like.

As further illustrated in FIGS. 1A-1B, the authentication system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101, such as, but not limited to the resource processing system 106, the user device 104 and the real-time interaction systems 190. As such, the communication device 146 generally comprises a modem, server, or other device for communicating with other devices on the network 101.

As further illustrated in FIGS. 1A-1B, the authentication system 108 comprises computer-readable instructions 154 stored in the memory device 150, which in one embodiment includes the computer-readable instructions 154 of an authentication application 158. In some embodiments, the memory device 150 includes data storage 152 for storing data related to the system environment, but not limited to data created and/or used by the authentication application 158. In some embodiments, the authentication application 158 provides assessment of network authentication requirements based on situational instance.

In the embodiment illustrated in FIGS. 1A-1B and described throughout much of this specification, the authentication application 158 is structured for dynamic stepped multi-level authentication, and authentication of user activities based on establishing communication links between network devices. In some embodiments, the authentication system 108 may retrieve user authentication information, financial information, and the like from the resource processing system 106. In this way, the authentication application 158 may communicate with the resource processing system 106, the user device 104, real-time interaction systems 190, merchant systems and other third-party systems to determine authentication requirements for a particular activity.

In some embodiments, the authentication application 158 may control the functioning of the user device 104. In some embodiments, the authentication application 158 computer readable instructions 154 or computer-readable program code, the when executed by the processing device 148, causes the processing device to perform one or more steps involved in enhanced secure resource transmissions, as described with respect to process flows 300-400 and FIG. 3-FIG. 5.

As illustrated in FIGS. 1A-1B, the resource processing system 106 is connected to the authentication system 108 and is associated with a financial institution network. In this way, while only one resource processing system 106 is illustrated in FIGS. 1A-1B, it is understood that multiple network systems may make up the system environment 100. The resource processing system 106 generally comprises a communication device 136, a processing device 138, and a memory device 140. The resource processing system 106 comprises computer-readable instructions 142 stored in the memory device 140, which in one embodiment includes the computer-readable instructions 142 of a resource processing application 144. The resource processing system 106 may communicate with the authentication system 108 to provide authentication credentials for user activities. The authentication system 108 may communicate with the resource processing system 106 via a secure connection 20 generated for secure encrypted communications between the two systems for ascertaining authentication requirements. In some embodiments, the secure connection 20 may be an operative communication link/channel established via the network 101.

As illustrated in FIGS. 1A-1B, the authentication system and environment comprises an entity system network 180 having one or more devices, such as, a first networked device 180a/resource processing terminal device 180a, a second networked device 180b, a third networked device 180c, . . . , an $N^{th}$ networked device 180n, and/or the like. In some embodiments, the first networked device 180a/resource processing terminal device 180a is a point of sale terminal, an ATM, and/or the like, structured for contactless communication with the resource instrument device 110 via the first proximity channel 10a. Communication via the first proximity channel 10a comprises communications using near field communication and/or radio frequency communication (RFID). This allows for the user 102 to wave their resource instrument device 110 proximate a reader at the first networked device 180a/resource processing terminal device 180a (e.g., a point of sale terminal, an ATM, etc.) of the entity system network 180, e.g., for performing resource transfers (e.g., payments) for a user activity (e.g., purchase). The second networked device 180b may refer to an entity device or group of devices (e.g., a beacon, a transmitter device, a beacon transmitter, a sensor device, a processing device, and/or the like, and/or a combination of the foregoing) having an entity intelligent platform application stored thereon. The second networked device 180b is structured to scan a predetermined vicinity around the first networked device 180a/resource processing terminal device 180a to identify devices having a multi-channel cognitive resource platform. The second networked device 180b is structured to establish an operative communication link 10c with the user device 104.

In some embodiments, each of the one or more devices of the entity system network 180 (e.g., first networked device 180a/resource processing terminal device 180a, second networked device 180b, third networked device 180c, . . . , $N^{th}$ networked device 180n, and/or the like) may comprise a communication device 166, a processing device 168, and a memory device 170, as detailed with respect to FIG. 2. The memory device 170 may further comprise computer readable instructions 172, and an entity application 174. For the second networked device 180b, the entity application 174 may refer to the entity intelligent platform application 174.

The real-time interaction systems 190 will be described in with respect to FIG. 5 later on. The real-time interaction systems 190 may comprise a communication device, a processing device, and a memory device having one or more applications.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates a schematic representation 200 of a resource processing terminal device 180a, in accordance with embodiments of the present invention. The resource processing terminal device 180a may also be referred to as a first networked device 180a, and may be a point of sale terminal, an ATM, an entity device, another network device, and/or any combination of the aforementioned devices.

The resource processing terminal device 180a may generally include a processing device or processor 168a communicably coupled to devices such as, a memory device 170a, output devices 230 (for example, a display device 232, or a speaker 234), input devices 240 (such as a microphone, keypad, touchpad, touch screen, and the like), a communication device or network interface device 166a, a power source 215, a clock or other timer 280, a visual capture device such as a camera 250, a positioning system device 260, such as a geo-positioning system device like a GPS device, an accelerometer, and the like, one or more chips, and the like. The processor 168a may further include a central processing unit 202, input/output (I/O) port controllers 204, a graphics controller 205, a serial bus controller 206 and a memory and local bus controller 208.

The processor 168a may include functionality to operate one or more software programs or applications, which may be stored in the memory device 170a. For example, the processor 168a may be capable of operating applications such as the entity application 174a. The entity application 174a may then allow the resource processing terminal device 180a to transmit and receive data and instructions from second networked device 180b (e.g., via the channel 10c), the authentication system 108, user device 104 and/or the resource processing system 106, web content, such as, for example, location-based content and/or other web page content, according to a Wireless Application Protocol (WAP), Hypertext Transfer Protocol (HTTP), and/or the like.

The entity application 174a may include the necessary circuitry to provide token storage and transmission functionality, transmitter device signal encoding and decoding functionality to the resource processing terminal device 180a, for secure transmission of financial and authentication credential tokens via the contactless communication interface 279. That said, in some embodiments the entity 174a is pre-installed on the resource processing terminal device 180a, while in other embodiments, the authentication system 108 and/or the resource processing system 106 may transmit and cause installation of the entity application 174a based on determining that the resource processing terminal device 180a does not comprise the application 174a.

The processor 168a may be configured to use the network interface device 166a to communicate with one or more other devices on a network 101 such as, but not limited to the user device 104, the resource instrument device 110, the second networked device 180b, the authentication system 108 and/or the resource processing system 106. In this regard, the network interface device 166a may include an antenna 276 operatively coupled to a transmitter 274 and a receiver 272 (together a "transceiver"), modem 278 and a contactless communication interface 279. The processor 168a may be configured to provide signals to and receive signals from the transmitter 274 and receiver 272, respectively. The signals may include signaling information in accordance with the air interface standard of the applicable BLE standard, cellular system of the wireless telephone network and the like, that may be part of the network 101. In this regard, the resource processing terminal device 180a may be configured to operate with one or more air interface standards, communication protocols, modulation types, and access types. By way of illustration, the resource processing terminal device 180a may be configured to operate in accordance with any of a number of first, second, third, and/or fourth-generation communication protocols and/or the like. For example, the resource processing terminal device 180a may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The resource processing terminal device 180a may also be configured to operate in accordance with non-cellular communication mechanisms, such as via a wireless local area network (WLAN) or other communication/data networks. The resource processing terminal device 180a may also be configured to operate in accordance Bluetooth® low energy, audio frequency, ultrasound frequency, or other communication/data networks.

The network interface device 166a or communication device 166a may also include an entity interface presented in output devices 230 in order to allow an individual associated with the entity to execute some or all of processes described herein. The application interface may have access to the hardware, for example, the transceiver, and software previously described with respect to the network interface device 166a. Furthermore, the application interface may have the ability to connect to and communicate with an external data storage on a separate system within the network 101. As described above, the resource processing terminal device 180a includes a display device 232 having a display interface that includes output devices 230 and/or input devices 240. The output devices 230 may include a display 232 (e.g., a liquid crystal display (LCD) or the like) and a speaker 234 or other audio device, which are operatively coupled to the processor 168a. The input devices 240, which may allow the resource processing terminal device 180a to receive data from the user 102 or an individual associated with the entity, may include any of a number of devices allowing the resource processing terminal device 180a to receive data, such as a keypad, keyboard, touchscreen, touchpad, microphone, mouse, joystick, other pointer device, button, soft key, and/or other input device(s).

The resource processing terminal device 180a may further include a power source 215 (e.g., a rechargeable DC power source). Generally, the power source 215 is a device that supplies electrical energy to an electrical load. In some embodiment, power source 215 may convert a form of energy such as solar energy, chemical energy, mechanical energy, and the like, to electrical energy. Generally, the power source 215 in a resource processing terminal device 180a may be a battery, such as a lithium battery, a nickel-metal hydride battery, or the like, that is used for powering various circuits, for example, the transceiver circuit, and other devices that are used to operate the resource processing terminal device 180a. Alternatively, the power source 215 may be a power adapter that can connect a power supply from a power outlet to the resource processing terminal device 180a. In such embodiments, a power adapter may be classified as a power source within the resource processing terminal device 180a.

As discussed previously, the resource processing terminal device 180a comprises computer-readable instructions 172a and data storage 118 stored in the memory device 170a, which in one embodiment includes the computer-readable instructions 172a of the entity application 174a. The resource processing terminal device 180a may also include a memory buffer, cache memory or temporary memory device operatively coupled to the processor 168a. Typically, one or more applications such as the entity application 174a, are loaded into the temporarily memory during use. As used herein, memory may include any computer readable medium configured to store data, code, or other information. The memory device 170a may include volatile memory, such as volatile Random-Access Memory (RAM) including a cache area for the temporary storage of data. The memory device 170a may also include non-volatile memory, which can be embedded and/or may be removable. The non-volatile memory may additionally or alternatively include an electrically erasable programmable read-only memory (EEPROM), flash memory or the like.

In some instances, the resource processing terminal device 180a comprises sensor devices 240 comprising biometric sensors for capturing parameters associated with the user, such as fingerprint scanners, voice recognition sensors, facial recognition sensors, user stress level sensors and the like. These biometric sensors 240 are configured to retrieve, receive, analyze and or validate biometric credentials associated with the user. In this regard, the biometric sensors 240 may comprise optical sensors, ultrasonic sensors, and/or capacitance sensors. The biometric sensors may further comprise radio frequency, thermal, pressure, piezo-resistive/piezoelectric, microelectromechanical sensors, and the like.

In some instances, various features and functions of the invention are described herein with respect to a "system." In some instances, the system may refer to the authentication system 108 and/or the resource processing system 106 performing one or more steps described herein in conjunction with other devices and systems, either automatically based on executing computer readable instructions of the memory device 150, or in response to receiving control instructions from the authentication system 108 and/or the resource processing system 106. In some instances, the system refers to the authentication system 108 and/or the resource processing system 106. In some instances, the system refers to the devices and systems on the network environment 100 of FIGS. 1A-1B. In some instances, the system refers to the resource processing terminal device 180a. The features and functions of various embodiments of the invention are described below in further detail.

Referring now to FIG. 3, illustrating a high-level process flow 300 for construction of a pre-authorized credential element for processing of a resource activity, in accordance with some embodiments of the invention. The process flow is structured for preemptive transformation and structuring of resource data at a resource instrument device 110, and authentication of resource data for processing, prior to initiation of a resource activity at the resource processing terminal device 180a. In some embodiments, some or all of the steps of the process flow 300 are performed by the authentication system 108, alone or in conjunction with the resource processing system 106, e.g., based on causing the user device 104, the first networked device 180a/resource processing terminal device 180a, and/or the second networked device 180b to perform certain functions. In some embodiments, the "system" as used with respect to the steps 302-308 herein may refer to the authentication system 108, or the authentication system 108 in combination with the resource processing system 106.

The process flow 300 begins with the system generating resource processing data for processing of a resource activity at a first time interval. The first time interval is associated with a time preceding/before an associated resource activity is even initiated by a user, and before entity (merchant) parameters and resource transfer parameters (e.g., resource value/payment amount) are created/available. Here, the system may perform these processing steps via the resource instrument device application. The resource instrument device application may be resident on the resource instrument device 110 itself, the user device 104, and/or the resource processing system 106. In some embodiments, the resource instrument device is stored at and/or operated by the resource processing system 106.

Here, the system may extract data associated with a user, e.g., data related to resources associated with the user, compatible resource instruments, and/or the like. In some embodiments, the system may analyze historical/preceding activities associated with the user. Based on the (i) data associated with a user, e.g., data related to resources associated with the user, compatible resource instruments, and/or the like, and/or (ii) data and parameters associated with historical/preceding activities associated with the user, the system typically determines parameters associated with an uninitiated, potential future activity that the user may perform in a impending time interval (e.g., within an upcoming week, upcoming day, between day/time A to day/time B. and/or the like.). The system may then construct the resource processing data, such that the resource processing data is configured for an impending/future resource activity having one or more parameters. The one or more parameters associated with resource processing data may comprise compatible resource instruments, future time interval during which the resource processing data may be active or employed to perform a resource activity, resource value thresholds (e.g., resource value in a predetermined range), applicable geographical regions (e.g., Area A), number of activities (e.g., 1-4 activities) and/or the like. Moreover, the system may generate a unique identifier associated with the user, and embed the same in the constructed resource processing data. This unique identifier may be employed to map potential future activities associated with the resource processing data.

Next, the system may pre-authenticate, via the resource instrument device application, the resource processing data for authorizing processing of the resource activity prior to initiation of the resource activity, as indicated by block 304. Here, the system may transmit control signals to the authentication system 108, to trigger the authentication system 108 to process the resource processing data and validate the data. The authentication system 108 may analyze the data, and determine whether the one or more parameters associated with resource processing data meet the authentication requirements of a first authentication level. For instance, the one or more parameters associated with resource processing data may be determined to be compatible with a first authentication level based on determining that the parameters are within predetermined threshold ranges associated with the authentication level (e.g., resource value parameters being below a maximum value associated with the first authentication level, the compatible resource instrument having a security level above a predetermined threshold), and/or the like. In the event that the one or more parameters associated with resource processing data are determined to be incompatible with a first authentication level, the system may modify one or more of the parameters associated with resource processing data, such that the modified parameters associated with resource processing data are compatible with the first authentication level. As a non-limiting example, the system may upgrade the compatible resource instrument to one with a higher security (e.g., from a paper check type resource instrument to a chip-card type resource instrument or a user device application token type resource instrument). Upon validation of the resource processing data, the authentication system 108, may transmit a validation signal.

Upon receipt of the validation signal, the system may pre-authenticate the resource processing data at a first authentication level, for use in congruent/compatible future activities. The system may generate an authentication code, which is structured to be decoded by a compatible device. When decoded, the authentication code is structured to indicate to the compatible device, that the associated resource processing data has been pre-authenticated for use, and can be utilized to complete the associated resource activity at the first authentication level, without requiring additional validation. Here, the system may embed an authentication code in pre-authenticated resource processing data. In some embodiments, the resource processing data is also encoded. In some embodiments, a compatible device may only decode the encoded resource processing data, using a key associated with the authentication code, which is only obtainable by compatible authorized devices, thereby providing high security to the resource processing data.

Next, at block 306, the system may transform, via the resource instrument device application, the pre-authenticated resource processing data to construct a first authorized credential element 111 such that the first authorized credential element 111 is compatible with the resource instrument device 110. In some embodiments, the resource processing data is encoded at this juncture. As discussed, in some embodiments, a compatible device may only decode the encoded resource processing data, using a key associated with the authentication code, which is only obtainable by compatible authorized devices, thereby providing high security to the resource processing data.

In some embodiments, the system may transform the pre-authenticated resource processing data into an authorized credential element having a visually reproducible form, e.g., QR code. This form of authorized credential element may be printed on the associated resource instrument device, such as a card, check, etc., displayed on a display device associated with a user device (e.g., smartphone), and/or the like (e.g., which may be scanned via optical communication channels, etc.). In some embodiments, the system may transform the pre-authenticated resource processing data into an authorized credential element compatible with an integrated circuit chip. This form of authorized credential element may be stored on an integrated circuit chip of a card type resource instrument device (e.g., which may be transmitted via near-filed communication channels, etc.). In some embodiments, the system may transform the pre-authenticated resource processing data into an authorized credential element compatible with an electronic token. This form of authorized credential element may be stored at a secure memory location of a user device and may be accessed and transmitted by a user device application (e.g., a digital wallet application) of a mobile device (e.g., a user device). As indicated by block 308, the system may provide the first authorized credential element 111 at the resource instrument device 110.

FIG. 4 illustrates a high-level process flow 400 for enhanced secure resource transmissions based on image capture via a resource processing terminal device, in accordance with some embodiments of the invention. The process flow involves preemptive transformation and structuring of resource data at a resource instrument device 110, and authentication of resource data for processing, prior to initiation of a resource activity at the resource processing terminal device 180a. In some embodiments, some or all of the steps of the process flow are performed by the authentication system 108, alone or in conjunction with the resource processing system 106, e.g., based on causing the user device 104, the first networked device 180a/resource processing terminal device 180a, and/or the second networked device 180b to perform certain functions. In some embodiments, the "system" as used with respect to the steps 402-412 herein may refer to the authentication system 108, or the authentication system 108 in combination with the resource processing system 106. In some embodiments, the process flow 400 is associated with deploying the pre-authenticated authorized credential element of process flow 300, for a subsequent activity.

First, at block 402, the system may receive via a first operative communication channel, a first trigger signal from the resource processing terminal device 180a at a second time interval (succeeding the first time interval of the construction of the first authorized credential element 111 as described with respect to process flow 300 previously). In some embodiments, the first trigger signal comprises a first activity data structure. Moreover, as indicated by block 404, the system may analyze the first trigger signal, and accordingly determine a first resource processing activity initiated by a user at the second time interval. In some embodiments, the system may receive resource activity processing data associated with a first activity initiated at the first networked device 180a/resource processing terminal device 180a by a user, from a first networked device 180a/resource processing terminal device 180a associated with first entity. Typically, the resource activity processing data comprises a unique identifier associated with the user activity processing parameters associated with performing the first activity. These unique identifiers may be user account numbers, credit card numbers, unique username/passcode combination, and/or other user information that can uniquely identify the user.

Here, in some embodiments, the process flow 400 begins with the system receiving information regarding at least one user activity (e.g., a transaction) associated with a user initiated at a first networked device 180a/resource processing terminal device 180a (e.g., a point of sale terminal, an ATM, etc.). Moreover, the system may receive resource activity processing data from the first networked device 180a/resource processing terminal device 180a. The resource activity processing data is typically associated with a first activity initiated at the first networked device 180a/resource processing terminal device 180a. The resource activity processing data typically comprises (i) the unique identifier associated with the user and (ii) activity processing parameters such as transaction details such as amount, entity/merchant identifiers, product/service purchase details, and/or the like. In some embodiments the system, for example, the receives information regarding the operative communication and the information regarding the first activity in real time. In this regard the system may receive information regarding the first activity that the user initiates or seeks to initiate, the first activity that the user in in the process of executing and/or the first activity that the user has completed. For example, the system may receive an indication that the user wishes to initiate the first activity with the entity (e.g., one or more merchants).

In some embodiments the system may receive the information regarding the first activity and/or perform the one or more subsequent steps of the process flow 400 during the initiation of the first activity. In this instance, the seamless dynamic authentication based on establishing seamless electronic communication handshake between network devices and without requiring user intervention of process flow 400, is associated with validating the first activity, approving the first activity and/or authorizing the first activity itself. In other embodiments, in addition to or separately from the previous embodiments, the system may receive the information regarding the first activity and/or perform one or more subsequent steps of the process flow 400 during the execution of the first activity, for example in the time period between the initiation and completion of the first activity by the user. Completion of the first activity, typically includes in some embodiments, completion or termination of the first activity from the user's perspective. For example, in some embodiments, the first activity is complete when at least the user is authenticated, the payment credentials are verified and the first activity is authorized and/or approved, after which the user considers the first activity complete and may leave the store, log off the merchant's website/payment portal, terminate the telephone call and the like. As another example, completion of the first activity, in some embodiments, comprises the entity/merchant submitting the relevant information associated with the first activity to a financial institution/entity for settlement, placing the first activity in a pending transaction queue for settlement and the like. In some embodiments, the first activity is temporarily authorized in the completion stage and is later routed for further processing and settlement. In some embodiments, the system may receive the information regarding the first activity and/or perform the subsequent steps of the process flow 400 after the completion of the first activity, for example, in the time period between the completion of the first activity by the user and the settlement of the first activity at a predetermined future settlement date, in combination with or distinctly from the previous embodiments. The predetermined future settlement date may comprise settlement of the first activity by the user's financial institution, by the entity/merchant or a financial institution associated with the merchant, debiting of the user account or posting payments after prior temporary authorization, transmitting funds associated with the first activity to the entity/merchant/merchant account and the like.

Next, at block 406, the system may transmit a control signal to a proximity scanner device 180*b* (also referred to as a second networked device 180*b*) associated with first entity. Typically, the control signal is structured to cause the proximity scanner device 180*b*/second networked device 180*b* to scan a predetermined vicinity radius (e.g., 1 to 5 feet, 0 to 10 feet, and/or the like) around the first networked device 180*a*/resource processing terminal device 180*a* to identify the resource instrument device 110 or devices having authorized credential element(s) 111. In some embodiments, the proximity scanner device 180*b*/second networked device 180*b* associated with the first entity comprises a beacon transmitter device.

In some embodiments, the proximity scanner device 180*b*/second networked device 180*b* is associated with a plurality of transmitter devices. Here, for scanning a predetermined vicinity radius around the first networked device 180*a*/resource processing terminal device 180*a*, the system may first activate the plurality of transmitter devices (e.g., beacon transmitters) proximate the first networked device 180*a*/resource processing terminal device 180*a* associated with the first entity. The system may then cause each of the plurality of transmitter devices to transmit a predetermined signal. The predetermine signal may comprise signal characteristics (e.g., frequency, modulation, encryption, content, encoding, content, etc.) that are only compatible with resource instrument devices 110 having authorized credential element(s) 111. The system may identify, via a first transmitter device of the plurality of transmitter devices, the first authorized credential element 111 and the resource instrument device 110 that it resides on. Next, the system may disable the plurality of transmitter devices associated with the first entity.

Next, at block 408, the system may transmit, via the resource processing terminal device 180*a*, second trigger signal to cause presentation of the first authorized credential element 111 associated with the resource instrument device 110. In this regard, the system may activate a resource instrument device application the resource instrument device 110, Here, activating the resource instrument device application further comprises (i) revoking user permissions associated with use of the resource instrument device 110, and (ii) causing a current application running on the resource instrument device 110 to run in the background, and subsequently controlling the resource instrument device 110 to present and/or transmit the first authorized credential element 111. In some embodiments, causing presentation of the first authorized credential element 111 associated with the resource instrument device 110 may comprise displaying an indication to the user to present the first authorized credential element 111 in a predetermined vicinity of a transmitter device or the first networked device 180*a*/resource processing terminal device 180*a*. Subsequently, the system may cause presentation of a graphical element associated with the first authorized credential element 111 on a display device associated with the resource instrument device 110, via the resource instrument device application. Alternatively, the user may present the first authorized credential element 111 in a predetermined vicinity of a transmitter device or the first networked device 180*a*/resource processing terminal device 180*a*.

In some embodiments, in response to the second trigger signal and prior to the extraction of data associated with the first authorized credential element 111 from the resource instrument device 110 via the first proximity communication channel between the first networked device and the resource instrument device 110, the system may trigger an escalated second authentication level requirement above the first authentication level based on at least the first authentication level and the resource activity processing data associated with the first resource processing activity. Here, the system may determine a location parameter associated with the resource instrument device 110, such that the location parameter is associated with the escalated second authentication level requirement. Next, the system may, dynamically and in-real time, modify the first authorized credential element 111 by embedding the location parameter associated with the escalated second authentication level requirement, in-situ.

The system may then extract, via the resource processing terminal device 180*a*, data associated with the first authorized credential element 111 from the resource instrument device 110 via the first proximity communication channel between the first networked device and the resource instrument device 110, as indicated by block 410. This extraction may be via near-field communication, electronic transmission, wireless communication, optical communication and/ or the like.

In response to determining the extraction of the data associated with the first authorized credential element 111 from the resource instrument device 110 via the first proximity communication channel between the first networked device and the resource instrument device 110 by the resource processing terminal device 180*a*, the system may dynamically trigger (i) discontinuation of the presentation of the graphical element associated with the first authorized credential element 111, and (ii) restoration of the user permissions.

As indicated by block 412, in response to determining that (i) the first authorized credential element 111 is compatible with the first resource processing activity, and that (ii) the first authorized credential element 111 is pre-authenticated prior to initiation of the first resource processing activity at the second time interval, the system may execute the first resource processing activity at a third time interval succeeding the second time interval using the first authorized credential element 111. Here, the system may complete the processing of the first resource processing activity and transmit an indication of successful completion to the user.

In order to determine that the first authorized credential element 111 is compatible with the first resource processing activity, the system may extract activity processing data from the first activity data structure associated with the first resource processing activity. Next, the system may determine a plurality of activity processing parameters associated with performing the first resource processing activity. The system may then transform the extracted data associated with the first authorized credential element 111 into resource processing data of the first authorized credential element 111. Subsequently, the system may determine that the first authorized credential element 111 is compatible with the first resource processing activity based on at least determining that at least one of the plurality of activity processing parameters associated with performing the first resource processing activity matches one or more parameters associated with resource processing data of the first authorized credential element 111. As discussed previously, the one or more parameters associated with resource processing data may comprise compatible resource instruments, future time interval during which the resource processing data may be active or employed to perform a resource activity, resource value thresholds (e.g., resource value in a predetermined range), applicable geographical regions (e.g., Area A), number of activities (e.g., 1-4 activities) and/or the like. The system may then verify whether the plurality of activity processing parameters associated with performing the first resource processing activity (e.g., resource value, location, second time interval, etc.) match the one or more parameters associated with resource processing data.

In order to determine that the first authorized credential element 111 is pre-authenticated prior to initiation of the first resource processing activity at the second time interval, the system may analyze extracted data associated with the first authorized credential element 111 to determine resource processing data of the first authorized credential element 111. Next, the system may detect the embedded authentication code in the extracted data associated with the first authorized credential element 111, and in response ascertain that the first authorized credential element 111 is pre-authenticated prior to initiation of the first resource processing activity at a first authentication level.

In some embodiments, in order to determine that the first authorized credential element 111 is pre-authenticated prior to initiation of the first resource processing activity at the second time interval, the system may analyze extracted data associated with the first authorized credential element 111 to determine resource processing data of the first authorized credential element 111. Next, the system may detect the location parameter in the extracted data associated with the first authorized credential element 111. Subsequently, the system may determine a spatial congruence of the location parameter and an entity location parameter associated with the resource processing terminal device 180*a*, and in response ascertain that the first authorized credential element 111 is pre-authenticated prior to initiation of the first resource processing activity at a second escalated authentication level.

In some embodiments, in response to determining that the first authorized credential element 111 is not compatible with the first resource processing activity, the system may transmit, via the resource processing terminal device 180*a*, third trigger signal to cause presentation of a second authorized credential element 111' associated with the resource instrument device 110, in a manner similar to that described with respect to blocks 406-408. The system may extract, via the resource processing terminal device 180*a*, data associated with the second authorized credential element 111' from the resource instrument device 110 via the first proximity communication channel between the first networked device and the resource instrument device 110. In response to determining that (i) the second authorized credential element 111' is compatible with the first resource processing activity, and that (ii) the second authorized credential element 111' is pre-authenticated prior to initiation of the first resource processing activity at the second time interval, the system may execute the first resource processing activity at the third time interval succeeding the second time interval using the second authorized credential element 111'.

In some embodiments, for executing the first resource processing activity, the system may create a resource exchange message for providing the resources to the first entity. Next, the system may operatively couple the first authorized credential element 111 to the resource exchange message. The system may transmit a resource value from a user resource associated with the user to an entity resource over a real-time resource exchange network in real-time using the resource exchange message, as will be described in detail with respect to FIG. 5. Here, the system may complete the processing of the first resource processing activity and transmit an indication of successful completion to the user.

In some embodiments, in response to determining completion of execution of the first resource processing activity using the first authorized credential element 111, the system may dynamically trigger (i) disabling of the first authorized credential element 111 such that the first authorized credential element 111 is inoperative, and (ii) deletion of the first authorized credential element 111.

FIG. 5 illustrates a schematic representation 500 of a real-time interaction system environment, in accordance with embodiments of the present invention. As used herein, a "real-time interaction" refers to a resource exchange (or transfer) between users and/or entities participating in and leveraging a settlement network operating in real-time (e.g., twenty-four hours a day, seven days a week), wherein settlement of the interaction occurs at or very close in time to the time of the interaction (i.e., real-time). A real-time interaction may include a resource exchange, wherein a real-time interaction system enables participants to initiate credit transfers, receive settlement for credit transfers, and make available to a receiving participant funds associated with the credit transfers in real-time, wherein the credit transfer may be final and irrevocable. Real-time interactions and resource exchanges provide marked improvements over conventional interaction clearing and transfer settlement methods (e.g., automated clearing house (ACH), wire, or the like) which can require several hours, days, or longer to receive, process, authenticate an interaction and resource exchange (i.e., clearing), and make funds available to the receiving participant which may, in total, require several back-and-forth communications between involved organizations (e.g., financial institutions). In some cases, conventional settlement methods may not be executed until the end of the business day (EOB), wherein resource exchanges are settled in batches between organizations.

Real-time interactions reduce settlement time by providing pre-authentication or authentication at the time of a requested interaction in order to enable instantaneous or near-instantaneous (i.e., real-time) resource exchange and settlement between organizations at the time of the interaction, wherein resources may be made immediately available to a receiving entity (i.e., payee) following completion of the interaction. Examples of real-time interactions include business to business interactions (e.g., supplier exchanges), business to consumer interactions (e.g., employee wages), consumer to business interactions (e.g., bill pay, payment at point-of-sale), and peer to peer (P2P) interactions (e.g., remittance between friends and family). In a specific example, a real-time interaction may be used for payment of a utility bill on the due date of the bill to ensure payment is received on-time. In some embodiments, a negotiable instrument (e.g., check, or the like) may be used to exchange resources; however, a real-time interaction may be used to make the resource exchange using the negotiable instrument. In another example, real-time interactions may be especially beneficial for small entities and users (e.g., small merchants/businesses) that may have a heavier reliance on short-term resources and may not prefer to wait days for resource settlements.

Real-time interactions not only provide settlement immediacy, but also provide assurance, reduction of unauthorized activities, and bank-grade security to resource exchanges due to the inherent nature of the resource exchange and user authentication infrastructure. Further, real-time interactions may reduce payment processing costs due to the simplified nature of required communication when compared to conventional settlement methods. In some embodiments, real-time interaction systems further include information and conversation tools that financial institutions may utilize to enhance a settlement experience for the entities.

A system leveraging a real-time resource exchange network allows for an interaction with a resource exchange to be completed between participating entities via an intermediary clearing house acting in the role of a neutral party. Organization resources (e.g., financial institution resources) are held at the resource exchange organization (e.g., clearing house) and administered by both the organization and the resource exchange organization. In this way, the resource exchange organization is able to exchange resources between organization resources on behalf of the organizations in order to settle interactions between entities affiliated with the organizations (e.g., customers of the organizations).

In the illustrated environment of FIG. 5, a first user 504 (e.g., user 104) is associated with (e.g., a customer of) a first organization 502 (e.g., financial institution, or the like) and a second user 508 (e.g., an individual associated with an entity, or the like) is associated (e.g., a customer of) a second organization 506 (e.g., a second financial institution, etc.). The real-time interaction system(s) 190 (e.g., a real-time interaction clearing house, or the like) may facilitate (e.g., hold, service, or the like) a first resource 512 (e.g., first account, or the like) associated with the first organization 502 (e.g., first financial institution, or the like) and a second resource 514 (e.g., second account, or the like) associated with the second organization 506 (e.g., second financial institution, or the like). The first resource 512 and the second resource 514 are accessible by each associated organization (e.g., the first organization 502 and the second organization 506, respectively) and the real-time interaction system(s) 190, which acts as a trusted intermediary during settlement between the organizations affiliated with each entity (e.g., each user 504, 508, and/or party 505, 509). Resource values (e.g., funds, or the like) may be transferred by each organization (e.g., first organization 502, second organization 506, or the like) to and from their associated resources 512, 514 with the real-time interaction system(s) 190. Exchanges between the first resource 512 and the second resource 514 are administered by the real-time interaction system(s) 190 pending authentication and authorization by participating entities of each resource exchange. It should be understood that since the real-time interaction system(s) 190 maintains resources for each organization, the transfer of resource values may be made in real-time as described herein (e.g., within 10, 5, or the like seconds). The amount of resources within the resources 512, 514 of the organizations 502, 506 may be estimated based on the estimated number of interactions and estimated amounts thereof that each organization 502, 506 typically enters on behalf of its entities (e.g., customers).

It should be further understood that the real-time interaction system(s) 190 may also have a routing directory 516 (e.g., stored in a memory, database, and/or the like). The routing directory 516 may be utilized by the real-time interaction system(s) 190, the other organizations 502, 506, and/or third parties in order to determine where and how to rout the real-time resource exchange for each interaction. As will be discussed in further detail herein, a real-time resource exchange message and/or an electronic document associated therewith may include one or more identifiers (e.g., token, QR Code, barcode, mobile number, e-mail address, or the like) that the real-time interaction system(s) 190 may utilize by looking up the one or more identifiers in the routing directory 516 in order to determine to which resource (e.g., second resource 514), organization (e.g., second organization), and/or entity (e.g., second entity—second user 508 and/or second party 509) to which the resources should be routed for the interaction. The resource directory 516 (e.g., one or more resource directories) may also be used to determine the processing, error codes, resource exchange treatments, or the like that may be used to process interactions and/or the associated resource exchanges.

In some embodiments, the real-time interaction system(s) 190 may further utilize an interaction portal module 518. The interaction portal module 518 may store information regarding the interactions and resources for each of the interactions of an organization (e.g., incoming and/or outgoing resource exchanges). Moreover, the real-time interaction system(s) 190 may also utilize an interaction reporting module 520 that allows for reporting regarding the interactions of an organization. For example, the interaction reporting module 520 may be used to send notifications to the organizations and/or entities related to the interactions that are entered into, in process, and/or completed, and interaction information related thereto.

As an illustrative example, the first user 504 and the second user 508 (associated with the entity or merchant) are participants of a real-time interaction, wherein the first user 504 (e.g., the payor) initiates a credit transfer to the second user 508 (e.g., the payee). The first user 504 may initiate the exchange from the first financial institution 502, wherein the first user 504 provides authentication credentials to authenticate the identity of the first user 504 and to validate that a first user resource of the first user 504 held at the first financial institution 502 contains available resources to fulfill the resource exchange. While in some embodiments, the first user 504 may initiate the exchange from a physical, brick-and-mortar location of the first organization 502, in alternative embodiments described herein, the exchange may be initiated from other locations wherein the first user 504 is not required to be at a brick-and-mortar location (e.g., initiated via an electronic application, a website, or the like, such as through a user device 110).

The first user 504, as the sending participant (e.g., payor), may be required to authenticate by providing credentials to the associated organization (e.g., first organization 502, real-time interaction system(s) 190, or the like). For example, authentication information may include account numbers, routing numbers, PIN numbers, username and password, date of birth, social security number, or the like, or other authentication information as described herein. In some embodiments, authentication may comprise multi-factor or multi-step authentication in accordance with information security standards and requirements.

As such, as used herein "authentication credentials" is any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device 110. This authentication information may be used to authenticate the identity of the user (e.g., determine that the authentication information is associated with the account) and determine that the user 102 has authority to access an account or system. The entity or organization may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing device, or the like to access, write, delete, copy, or modify data within at least a portion of the system.

Returning to the illustrative example, upon initiating an interaction, the first user 504 may seek to exchange the resources for the interaction. As such, in some embodiments the interaction, and resource exchange thereof, may not be canceled by the first user 504 following initiation and communication to an intermediary and/or a receiving participant of the interaction. The second user 508, as the receiving participant (e.g., the payee), receives communication to accept the resource exchange, in some embodiments following similar user authentication requirements made by the first user 504. Communication between participants for the interaction may be transmitted between the organizations 502, 506 via the real-time interaction system(s) 190, which directs the resource exchange to the appropriate organizations 502, 506 associated with the participants (e.g., organizations, entities, or the like). The exchange of resources occurs between the resources 512, 514 of the financial institutions 502, 506 on behalf of their respective users 504, 508, wherein the interaction may be settled immediately, concurrent with the resource exchange. As settlement occurs between the representative organizations (e.g., financial institutions, clearing house), debiting and crediting of individual user resources may be managed at each organization with their individual customer and through the organization resources at the resource exchange organizations 210. As the interaction is settled immediately, resources may be made available for use in real-time, which may be immediate or near real-time. It should be understood that real-time may be within minutes, seconds, (e.g., within 60, 40, 20, 15, 10, 5, 4, 3, 2, 1, or the like seconds), or the like.

It should be understood that while the illustrated embodiments of FIG. 5 depict only first and second users 504, 506, organizations 502, 506, and resources 512, 514, other embodiments of a real-time interaction network may comprise a plurality of resources for a plurality of organizations (e.g., financial institutions), and/or for a plurality of entities. In some embodiments, the real-time interaction environment 200 may further comprise more than one real-time interaction system(s) 190 or at least a plurality of resource exchange organizations (e.g., TCHs, the Federal Reserve, and the like), which cooperate within a resource exchange network to receive and process interaction requests as described herein. It should be understood that the organizations 502, 506 may include one or more community banks, regional banks, credit unions, corporate banks, direct connect financial institutions, or the like. When the organization is a "financial organization", such as a "financial institution", these terms may mean any organization that processes financial transactions (e.g., a transfer of funds or other monetary or financial resources) including, but not limited to, banks, credit unions, savings and loan associations, investment companies, stock brokerages, insurance companies and the like. In specific embodiments of the invention, use of the term "bank" is limited to a financial entity in which account-bearing customers conduct financial transactions, such as account deposits, withdrawals, transfers and the like.

The system identifies a resource request from a second entity (e.g., second user 508, second party 509—such as a merchant, service provider, or the like). In some embodiments the system (e.g., real-time interaction systems 190, one or more organization systems 160, or the like) may receive a notification from an entity (e.g., second entity) regarding a resource request for a customer entity (e.g., first entity). This may occur because the first entity (e.g., customer entity) has linked the first entity resource held by the first organization with a third-party (e.g., third party service provider) that the first entity uses. For example, an electronic bill from a service provider may be sent to the financial institution that holds the account of the customer because the customer linked its service provider account with its financial institution account. Consequently, the resource request may be sent to the first entity organization that holds the first entity resource (e.g., the user's financial institution, or the like), may be sent directly to the first entity (e.g., on the user device 110, or by mail), may be sent to both the first entity and the first organization, or the like. In some embodiments, the system may not identify the resource request directly from the second entity because, for example, the resource request is sent directly to the first entity (e.g., paper or electronic bill is sent to the first user 504 and not the first organization 504).

An indication is received from the first entity (e.g., first user 504, first party 505) and/or the first organization 502 (e.g., acting on behalf of the first user 504) that the first entity would like to enter into an interaction (e.g., a resource exchange) in response to the resource request (e.g., a bill, or the like). For example, the system may receive an indication from the first user 504 that it would like to transfer resources to the service provider.

The system may identify an electronic request instrument for the interaction. In some embodiments, the electronic request instrument may be an electronic version of a physical request instrument (e.g., a physical paper bill, paper agreement, coupon slip, or other like paper request) that may be used to request resources from an entity. For example, the system may identify an image of a physical request instrument (e.g., a bill) that was captured by a first user 504 using an image capture device 115 of the user device 110. Alternatively, the resource request from the second entity may include information that allows for the creation of an electronic version of a request instrument without having to create a physical request instrument (e.g., paper bill). Regardless of how the electronic request instrument is created, it may include information for the interaction and/or associated resource exchange, such as but not limited to the payee, interaction amount, interaction communication for the payee, the one or more identifiers that may be used to capture information from the request instrument or determine routing of the resources, or the like.

A communication linkage is established between the systems. For example, between two or more of the first entity system (e.g., first user device, first party system, or the like), the second entity system (e.g., second user device, second party system, or the like), a first organization system, a second organization system, and/or the resource exchange organization. The communication linkage allows for the interaction and the associated resource exchange related to the resource request.

A resource exchange message for the interaction between the entities (e.g., first entity, second entity) is created. The resource exchange message may include a real-time message that conforms to ISO 2000 messaging for real-time interactions. In some embodiments of the invention, the resource exchange message may be populated with interaction information (or resource request information) from the resource request of the second entity and/or the interaction request of the first entity in response to the resource request. Alternatively, or additionally, the resource exchange message may be populated with information from the electronic request instrument (e.g., image of the physical bill, electronic bill, or the like). That is, interaction information may be captured from the electronic request instrument (e.g., using metadata attached to the electronic instrument, using optical character recognition and/or other readers to read information in an image of the electronic instrument, scanning of one or more identifiers—such as, QR codes, barcodes, or the like on the electronic request instrument, or the like). It should be understood that in some embodiments, the system (e.g., organization system, resource exchange organization system, and/or real-time exchange system) may take information directly from the electronic resource request (e.g., by capturing information from the resource request instrument itself, or from an identifier that stores information related to the resource request) in order to populate the resource exchange message, which is then used to make the real-time resource exchange, as will be discussed herein.

The electronic resource request instrument may be operatively coupled to the resource exchange message. In typical interactions, the resource transfer does not have any documentation associated with the resource processing. Moreover, when processing interactions using traditional rails (e.g., ACH, wires, or the like that take days) the communications over the rails do not have the capability to include documents, messages between the entities, or the like. As such, additional applications and programing would be required to link any traditional interactions to any documentations separately apart from the traditional processing rails. Unlike the traditional processing, the real-time exchange messages allows for the inclusion of other information besides the resource exchange details, as such, the resource exchange message can include communications between the entities (e.g., descriptions of the interaction, instructions for the entities, or the like), the electronic request instrument (e.g., bill, coupon, receipt), or the like, such that any tracking, monitoring, reporting, or other like functions can be performed directly by the entities using the resource exchange message without having the specific applications and/or systems dedicated to tracking such information with respect to traditional interaction processing.

Moreover, it should be understood that in some situations the entities may want to have a representation of the interaction, for example, an electronic representation of the interaction (e.g., that can be printed for creating a paper trail, for displaying to an organization, for displaying to the other entity in the interaction, or the like). As such, the resource exchange message and/or the electronic request instrument may be used by the entities and/or organizations to verify resource exchanges for the interaction. For example, the electronic request instrument may be used in particular situations in which an entity is entering into the interactions for property (e.g., land, cars, or the like), in which paper instruments provide a potential security issue due to loss, damage, misappropriation, or the like of the negotiable instruments.

After the resource exchange message is finalized, the resources are exchanged from the first entity resource with the first organization, to the first organization resource at the resource exchange organization. Furthermore, the resources are exchanged from the second organization resource to the second entity resource. Before, during or after these exchanges the resources are exchanged between the first organization resource and the second organization resource by the resource exchange organization facilitating the interactions between the entities. It should be understood that the resources are exchanged in real-time using the resource exchange message. In some embodiments, the resource exchange message may include interaction information, such as one or more identifiers, which the resource exchange organization may utilize in order make the resource exchange. For example, the resource exchange organization may access a routing directory 516 and use the one or more identifiers to identify the second resource 514 and/or the second organization 506, second user 508, and/or second party 509 to which the resources are being transferred.

The interaction is settled along with the exchange of resources in real-time. For example, the accounting of the resource exchanges between the entities and/or the organizations is accounted for by the resource exchange organization, the first organization, and/or the second organization (e.g., within a general ledger and/or organization specific ledgers, or the like).

The interaction, the resource exchange, and/or the electronic resource request instrument are stored for record keeping and/or reporting (e.g., in the interaction portal module 518, interaction reporting module 520, or the like). The organizations may access the interactions and the resource exchanges for the interactions, and/or the electronic request instruments for a plurality of interactions for second interaction confirmations, resource request deadlines, or the like.

In some embodiments of the invention, it should be understood that additional security measures may be put in place in order to verify the parties involved in the interaction before the resource exchange is made. It should be understood that since the real-time resource exchange results in immediate transfer of resources between the entities that cannot be canceled, additional security measures may be put in place to reduce unauthorized interactions and/or resource exchanges. For example, additional verification may be required before the resource exchange is made when a new payee is being identified, a threshold resource amount is reached for the interaction (e.g., over $500, $1000, $2000, $5000, or the like), multiple interactions are entered into with the same entity, multiple interactions are made with entities located in particular regions, or the like occurs. For example, the additional verification may include two-factor authentication, security questions, passwords, verification from different user devices, or the like in order to provide a higher level of confidence that the interaction is not a misappropriated interaction.

It should be understood that the resource exchange messages (e.g., the ISO messages, or the like) used for real-time interactions are much more robust than typical automated clearing houses (AHC) and wire communications for typical interactions. The resource exchange messages are much faster (e.g., within seconds) and much more secure (e.g., no physical instruments are used). In some embodiments of the invention no account numbers need to be used, and instead the one or more identifiers are all that is required to exchange resources.

In some embodiments, the systems described herein may comprise a plurality of subsystems having a plurality of subsystem formats, wherein the system may transmit the update to the plurality of subsystems based on a subsystem format associated with each of the individual subsystems. For example, a system may comprise subsystems having a mixture of real-time interaction formats and batch processing formats. The system is configured to transmit the update to each of the subsystems individually depending on an associated subsystem format of each subsystem.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for enhanced secure resource transmissions based on image capture via a resource processing terminal device, wherein the system provides a secure platform for preemptive transformation and structuring of resource data at a resource instrument device, and authentication of resource data for processing, prior to initiation of a resource activity at the resource processing terminal device, the system comprising:
   a resource processing terminal device structured for operative communication with a resource instrument device via a first proximity communication channel between the resource processing terminal device and the resource instrument device, wherein the resource processing terminal device comprises:
      a proximity scanner device structured for detecting at least one parameter associated with the resource instrument device via the first proximity communication channel;
   at least one memory device;
   at least one communication device connected to a distributed network;
   at least one processing device operatively coupled to the at least one memory device; and
   a module stored in the at least one memory device comprising executable instructions that when executed by the at least one processing device, cause the at least one processing device to:
      construct, via a resource instrument device application, a first authorized credential element for processing of a resource activity at a first time interval prior to initiation of the resource activity, wherein the first authorized credential element is structured for authorizing processing of the resource activity prior to initiation of the resource activity;
      receive, via a first operative communication channel, a first trigger signal from the resource processing terminal device at a second time interval succeeding the first time interval, wherein the first trigger signal comprises a first activity data structure;
      based on analyzing the first trigger signal, determine a first resource processing activity initiated by a user at the second time interval;
      transmit a control signal to the proximity scanner device associated with a first entity, wherein the control signal is structured to cause the proximity scanner device to scan a predetermined vicinity radius around the resource processing terminal device to identify the resource instrument device;
      transmit, via the resource processing terminal device, second trigger signal to cause presentation of the first authorized credential element associated with the resource instrument device;
      extract, via the resource processing terminal device, data associated with the first authorized credential element from the resource instrument device via the first proximity communication channel between the resource processing terminal device and the resource instrument device; and
      in response to determining that (i) the first authorized credential element is compatible with the first resource processing activity, and that (ii) the first authorized credential element is pre-authenticated prior to initiation of the first resource processing activity at the second time interval, execute the first resource processing activity at a third time interval succeeding the second time interval using the first authorized credential element.

2. The system of claim 1, wherein constructing the first authorized credential element for processing of the resource activity at the first time interval prior to initiation of the resource activity, further comprises:

generating, via a resource instrument device application, resource processing data for processing of a resource activity at a first time interval, prior to initiation of the resource activity, wherein the resource processing data is associated with a user, wherein the resource processing data comprises a unique identifier associated with the user;

pre-authenticating, via the resource instrument device application, the resource processing data for authorizing processing of the resource activity prior to initiation of the resource activity;

transforming, via the resource instrument device application, the pre-authenticated resource processing data to construct a first authorized credential element such that the first authorized credential element is compatible with the resource instrument device; and providing the first authorized credential element at the resource instrument device.

3. The system of claim 2, wherein pre-authenticating the resource processing data for authorizing processing of the resource activity prior to initiation of the resource activity, further comprises: embedding an authentication code in pre-authenticated resource processing data.

4. The system of claim 1, wherein causing presentation of the first authorized credential element associated with the resource instrument device further comprises:

activating a resource instrument device application the resource instrument device, wherein activating the resource instrument device application further comprises (i) revoking user permissions associated with use of the resource instrument device, and (ii) causing a current application running on the resource instrument device to run in background;

presenting, via the resource instrument device application, a graphical element associated with the first authorized credential element on a display device associated with the resource instrument device; and in response to determining the extraction of the data associated with the first authorized credential element from the resource instrument device via the first proximity communication channel between the resource processing terminal device and the resource instrument device by the resource processing terminal device, dynamically triggering (i) discontinuation of the presentation of the graphical element associated with the first authorized credential element, and (ii) restoration of the user permissions.

5. The system of claim 1, wherein determining that the first authorized credential element is compatible with the first resource processing activity further comprises:

extracting activity processing data from the first activity data structure associated with the first resource processing activity;

determining a plurality of activity processing parameters associated with performing the first resource processing activity;

transforming the extracted activity processing data associated with the first authorized credential element into resource processing data of the first authorized credential element; and determining that the first authorized credential element is compatible with the first resource processing activity based on at least determining that at least one of the plurality of activity processing parameters associated with performing the first resource processing activity matches one or more parameters associated with resource processing data of the first authorized credential element.

6. The system of claim 1, wherein determining that the first authorized credential element is pre-authenticated prior to initiation of the first resource processing activity at the second time interval, further comprises:

analyzing extracted data associated with the first authorized credential element to determine resource processing data of the first authorized credential element; and detecting an embedded authentication code in the extracted data associated with the first authorized credential element.

7. The system of claim 1, wherein the first authorized credential element is pre-authenticated at a first authentication level, wherein the executable instructions when executed by the at least one processing device further cause the at least one processing device to:

in response to the second trigger signal and prior to extracting data associated with the first authorized credential element from the resource instrument device via the first proximity communication channel between the resource processing terminal device and the resource instrument device, trigger an escalated second authentication level requirement above the first authentication level based on at least the first authentication level and resource processing data associated with the first resource processing activity;

determine a location parameter associated with the resource instrument device, such that the location parameter is associated with the escalated second authentication level requirement; and modify the first authorized credential element by embedding the location parameter associated with the escalated second authentication level requirement.

8. The system of claim 7, determining that the first authorized credential element is pre-authenticated prior to initiation of the first resource processing activity at the second time interval, further comprises:

analyzing extracted data associated with the first authorized credential element to determine resource processing data of the first authorized credential element;

detecting the location parameter in the extracted data associated with the first authorized credential element; and determining a spatial congruence of the location parameter and an entity location parameter associated with the resource processing terminal device.

9. The system of claim 1, wherein the executable instructions when executed by the at least one processing device further cause the at least one processing device to:

in response to determining completion of execution of the first resource processing activity using the first authorized credential element, dynamically trigger (i) disabling of the first authorized credential element such that the first authorized credential element is inoperative, and (ii) deletion of the first authorized credential element.

10. The system of claim 1, wherein the executable instructions when executed by the at least one processing device further cause the at least one processing device to:

in response to determining that the first authorized credential element is not compatible with the first resource processing activity, transmit, via the resource processing terminal device, third trigger signal to cause presentation of a second authorized credential element associated with the resource instrument device;

extract, via the resource processing terminal device, data associated with the second authorized credential element from the resource instrument device via the first proximity communication channel between the resource processing terminal device and the resource instrument device; and in response to determining that (i) the second authorized credential element is compatible with the first resource processing activity, and that (ii) the second authorized credential element is pre-authenticated prior to initiation of the first resource processing activity at the second time interval, execute the first resource processing activity at the third time interval succeeding the second time interval using the second authorized credential element.

11. The system of claim 1, wherein the resource instrument device comprises an integrated circuit chip, wherein the resource instrument device is structured for contactless communication with the resource processing terminal device via the first proximity communication channel comprising near field communication and/or radio frequency communication (RFID).

12. The system of claim 1, wherein the resource instrument device is a physical object, and wherein the first proximity communication channel comprises optical communication.

13. The system of claim 1, wherein transmitting the control signal to the proximity scanner device associated with the first entity to cause the proximity scanner device to scan the predetermined vicinity radius around the resource processing terminal device, further comprises:

activating a plurality of transmitter devices proximate the resource processing terminal device associated with the first entity;

causing each of the plurality of transmitter devices to transmit a predetermined signal to scan for devices having the first authorized credential element;

identifying, via a first transmitter device of the plurality of transmitter devices, the first authorized credential element of the resource instrument device; and disabling the plurality of transmitter devices associated with the first entity.

14. The system of claim 1, wherein executing the first resource processing activity at the third time interval succeeding the second time interval using the first authorized credential element, further comprises:

creating a resource exchange message for providing resources to the first entity;

operatively coupling the first authorized credential element to the resource exchange message; and transmitting a resource value from a user resource associated with the user to an entity resource over a real-time resource exchange network in real-time using the resource exchange message.

15. A method for enhanced secure resource transmissions based on image capture via a resource processing terminal device, wherein the method provides a secure platform for preemptive transformation and structuring of resource data at a resource instrument device, and authentication of resource data for processing, prior to initiation of a resource activity at the resource processing terminal device, the method comprising:

constructing, via a resource instrument device application, a first authorized credential element for processing of a resource activity at a first time interval prior to initiation of the resource activity, wherein the first authorized credential element is structured for authorizing processing of the resource activity prior to initiation of the resource activity;

receiving, via a first operative communication channel, a first trigger signal from a resource processing terminal device at a second time interval succeeding the first time interval, wherein the first trigger signal comprises a first activity data structure;

based on analyzing the first trigger signal, determining a first resource processing activity initiated by a user at the second time interval;

transmitting a control signal to a proximity scanner device associated with a first entity, wherein the control signal is structured to cause the proximity scanner device to scan a predetermined vicinity radius around the resource processing terminal device to identify the resource instrument device;

transmitting, via the resource processing terminal device, second trigger signal to cause presentation of the first authorized credential element associated with the resource instrument device;

extracting, via the resource processing terminal device, data associated with the first authorized credential element from a resource instrument device via a first proximity communication channel between the resource processing terminal device and the resource instrument device; and in response to determining that (i) the first authorized credential element is compatible with the first resource processing activity, and that (ii) the first authorized credential element is pre-authenticated prior to initiation of the first resource processing activity at the second time interval, executing the first resource processing activity at a third time interval succeeding the second time interval using the first authorized credential element.

16. The method of claim 15, wherein constructing the first authorized credential element for processing of the resource activity at the first time interval prior to initiation of the resource activity, further comprises:

generating, via a resource instrument device application, resource processing data for processing of a resource activity at a first time interval, prior to initiation of the resource activity, wherein the resource processing data is associated with a user, wherein the resource processing data comprises a unique identifier associated with the user;

pre-authenticating, via the resource instrument device application, the resource processing data for authorizing processing of the resource activity prior to initiation of the resource activity;

transforming, via the resource instrument device application, the pre-authenticated resource processing data to construct a first authorized credential element such that the first authorized credential element is compatible with the resource instrument device; and providing the first authorized credential element at the resource instrument device.

17. The method of claim 15, wherein the first authorized credential element is pre-authenticated at a first authentication level, wherein the method further comprises:

in response to the second trigger signal and prior to the extraction of data associated with the first authorized credential element from the resource instrument device via the first proximity communication channel between the resource processing terminal device and the resource instrument device, triggering an escalated second authentication level requirement above the first authentication level based on at least the first authentication level and resource processing data associated with the first resource processing activity;
determining a location parameter associated with the resource instrument device, such that the location parameter is associated with the escalated second authentication level requirement; and
modifying the first authorized credential element by embedding the location parameter associated with the escalated second authentication level requirement.

18. A computer program product for enhanced secure resource transmissions based on image capture via a resource processing terminal device, wherein the computer program product provides a secure platform for preemptive transformation and structuring of resource data at a resource instrument device, and authentication of resource data for processing, prior to initiation of a resource activity at the resource processing terminal device, wherein the computer program product comprises a non-transitory computer-readable medium comprising code that when executed causes a first apparatus to:
construct, via a resource instrument device application, a first authorized credential element for processing of a resource activity at a first time interval prior to initiation of the resource activity, wherein the first authorized credential element is structured for authorizing processing of the resource activity prior to initiation of the resource activity;
receive, via a first operative communication channel, a first trigger signal from a resource processing terminal device at a second time interval succeeding the first time interval, wherein the first trigger signal comprises a first activity data structure;
based on analyzing the first trigger signal, determine a first resource processing activity initiated by a user at the second time interval;
transmit a control signal to a proximity scanner device associated with a first entity, wherein the control signal is structured to cause the proximity scanner device to scan a predetermined vicinity radius around the resource processing terminal device to identify the resource instrument device;
transmit, via the resource processing terminal device, second trigger signal to cause presentation of the first authorized credential element associated with the resource instrument device;
extract, via the resource processing terminal device, data associated with the first authorized credential element from a resource instrument device via a first proximity communication channel between the resource processing terminal device and the resource instrument device; and
in response to determining that (i) the first authorized credential element is compatible with the first resource processing activity, and that (ii) the first authorized credential element is pre-authenticated prior to initiation of the first resource processing activity at the second time interval, execute the first resource processing activity at a third time interval succeeding the second time interval using the first authorized credential element.

19. The computer program product of claim 18, wherein constructing the first authorized credential element for processing of the resource activity at the first time interval prior to initiation of the resource activity, further comprises:
generating, via a resource instrument device application, resource processing data for processing of a resource activity at a first time interval, prior to initiation of the resource activity, wherein the resource processing data is associated with a user, wherein the resource processing data comprises a unique identifier associated with the user;
pre-authenticating, via the resource instrument device application, the resource processing data for authorizing processing of the resource activity prior to initiation of the resource activity;
transforming, via the resource instrument device application, the pre-authenticated resource processing data to construct a first authorized credential element such that the first authorized credential element is compatible with the resource instrument device; and
providing the first authorized credential element at the resource instrument device.

20. The computer program product of claim 18, wherein the first authorized credential element is pre-authenticated at a first authentication level, wherein the non-transitory computer-readable medium further comprises code that when executed causes the first apparatus to:
in response to the second trigger signal and prior to the extraction of data associated with the first authorized credential element from the resource instrument device via the first proximity communication channel between the resource processing terminal device and the resource instrument device, trigger an escalated second authentication level requirement above the first authentication level based on at least the first authentication level and resource processing data associated with the first resource processing activity;
determine a location parameter associated with the resource instrument device, such that the location parameter is associated with the escalated second authentication level requirement; and
modify the first authorized credential element by embedding the location parameter associated with the escalated second authentication level requirement.

* * * * *